Oct. 4, 1932.  W. B. FAGEOL  1,880,953
RAIL CAR CONSTRUCTION
Filed Feb. 13, 1929  15 Sheets-Sheet 1
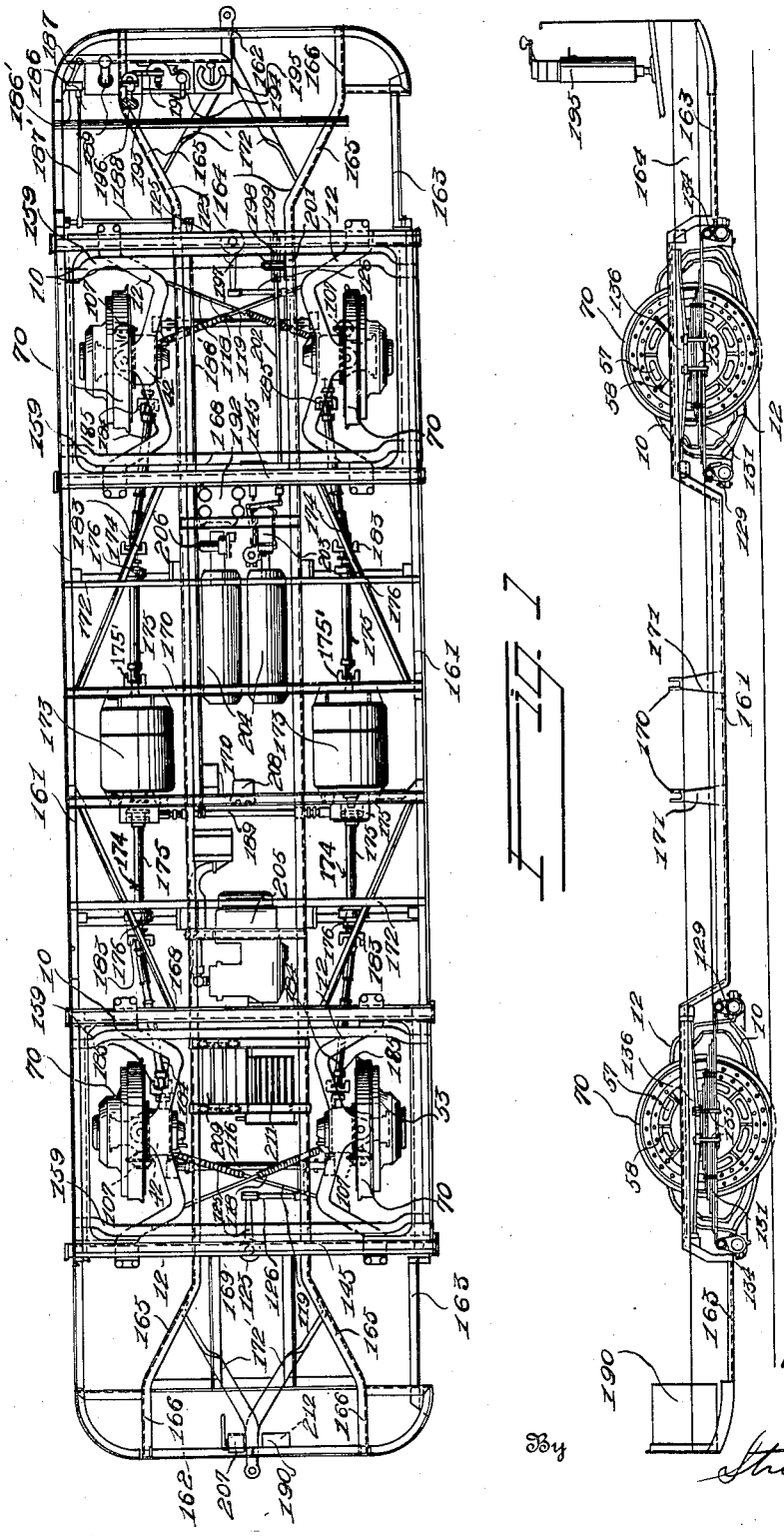
Inventor
William B. Fageol
By
Strauch & Hoffman
Attorneys

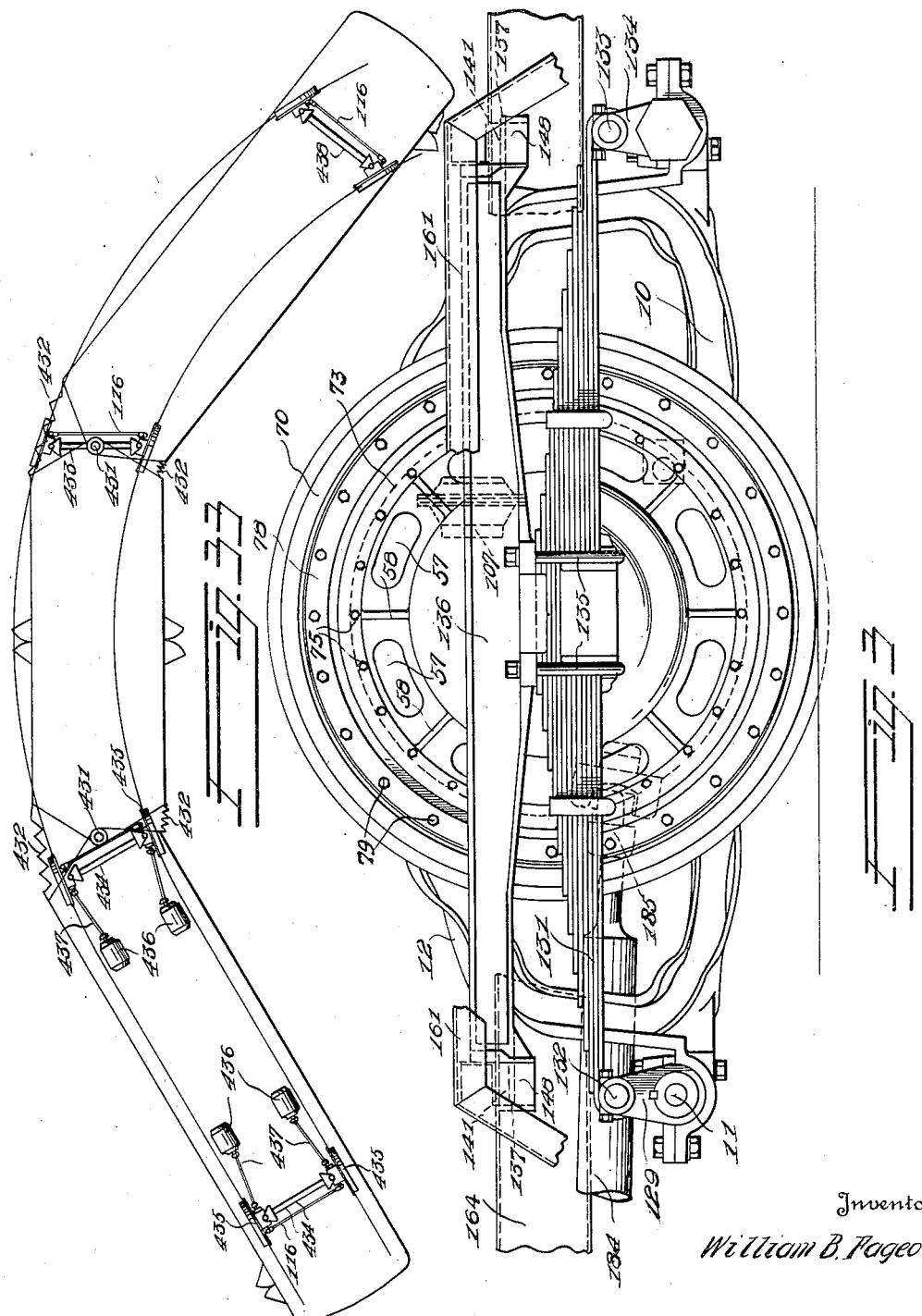

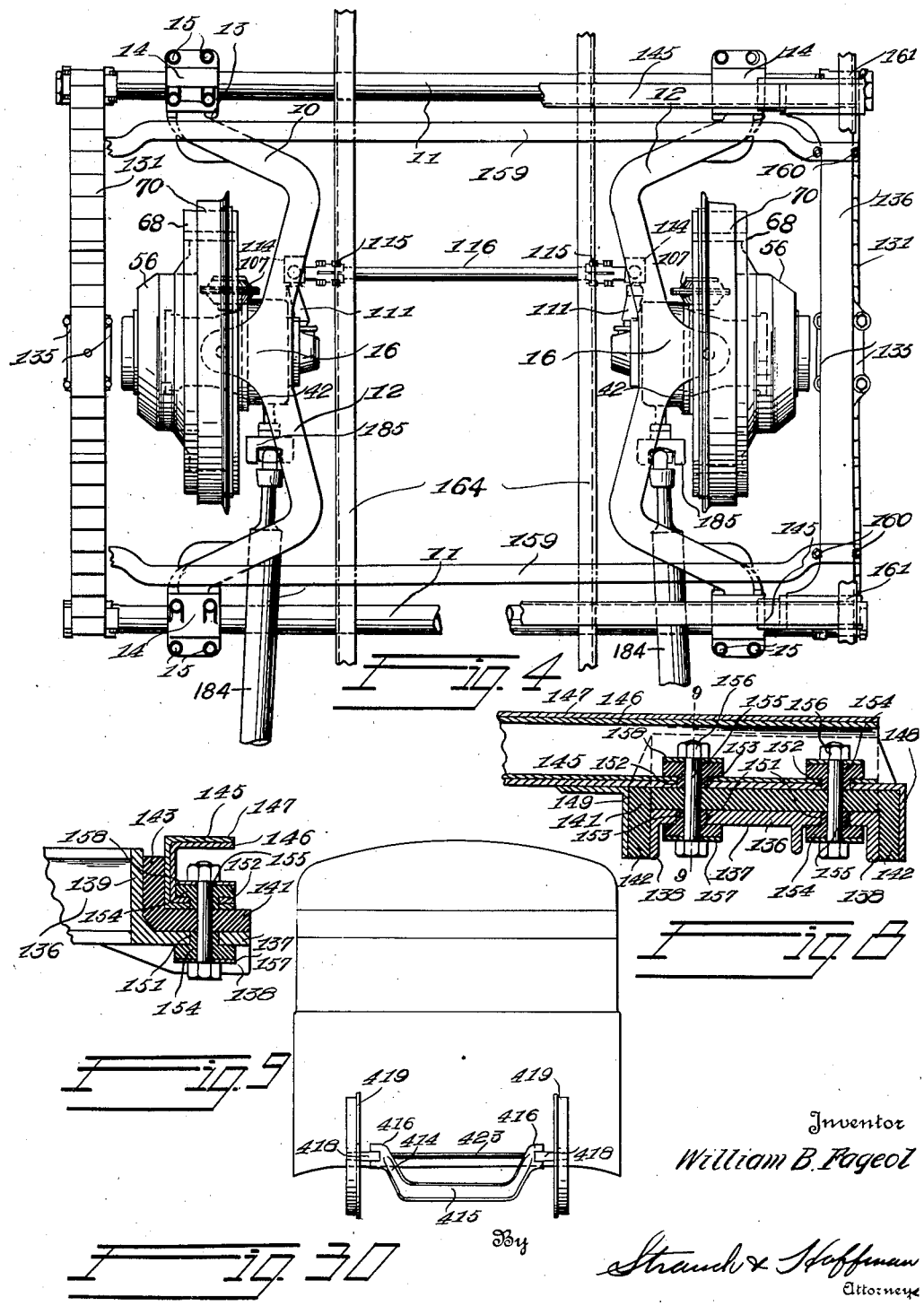

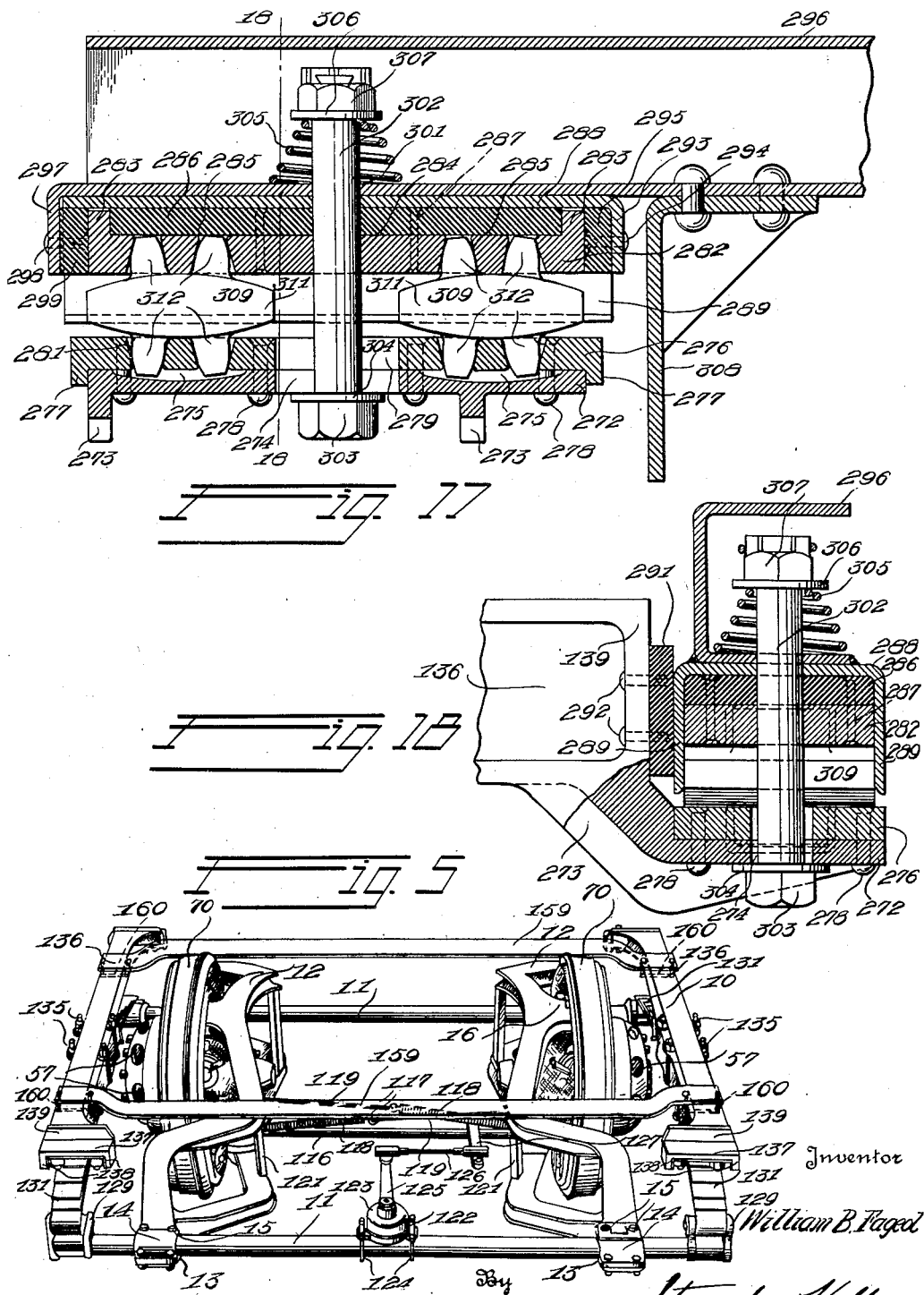

Oct. 4, 1932.  W. B. FAGEOL  1,880,953
RAIL CAR CONSTRUCTION
Filed Feb. 13, 1929  15 Sheets-Sheet 5

Inventor
William B. Fageol
By
Strauch & Hoffman
Attorneys

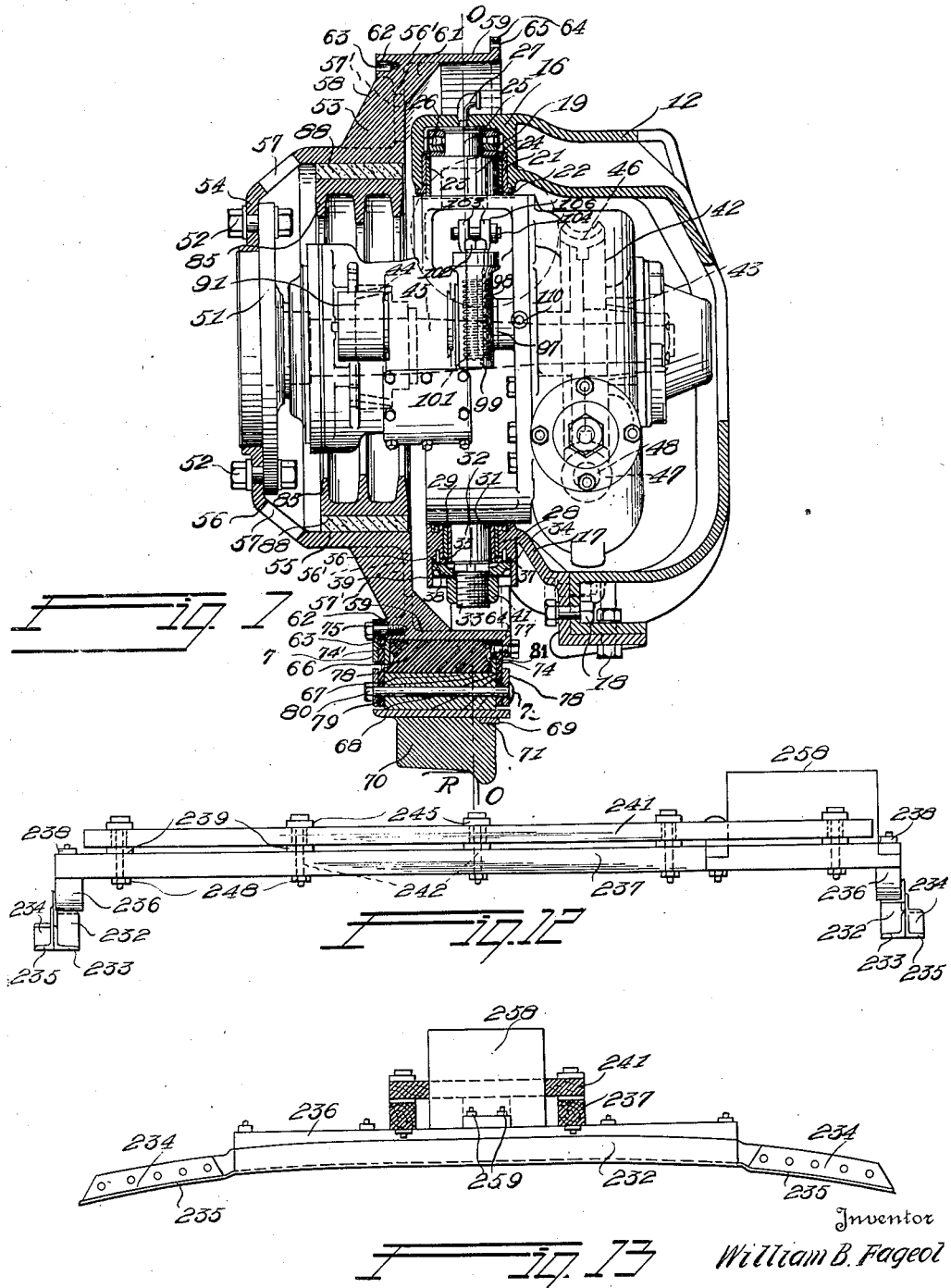

Oct. 4, 1932.　　　W. B. FAGEOL　　　1,880,953
RAIL CAR CONSTRUCTION
Filed Feb. 13, 1929　　　15 Sheets-Sheet 7
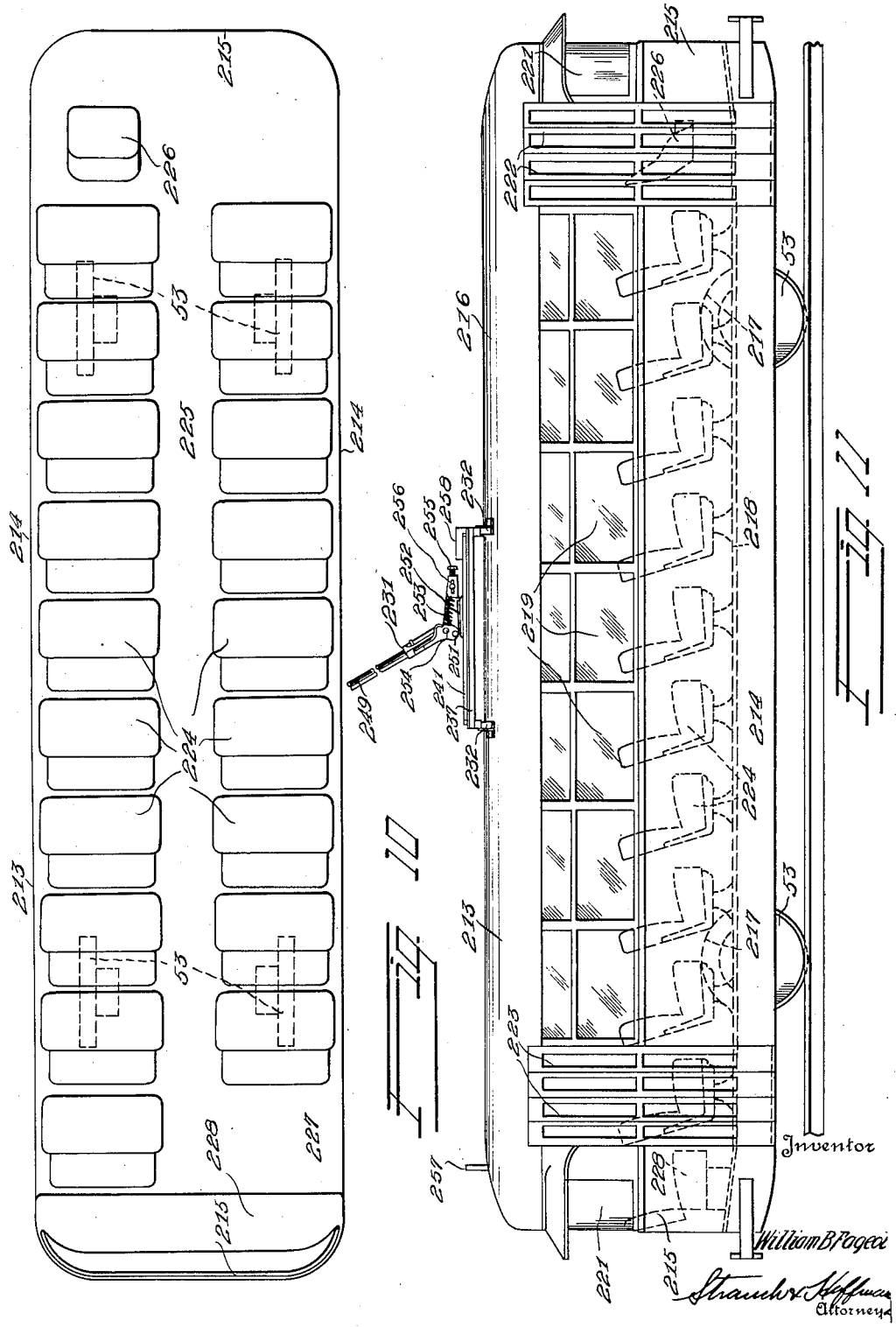

Oct. 4, 1932.   W. B. FAGEOL   1,880,953
RAIL CAR CONSTRUCTION
Filed Feb. 13, 1929   15 Sheets-Sheet 8

Inventor
William B. Fageol
By
Strauch & Hoffman
Attorneys

Oct. 4, 1932. W. B. FAGEOL 1,880,953
RAIL CAR CONSTRUCTION
Filed Feb. 13, 1929 15 Sheets-Sheet 9
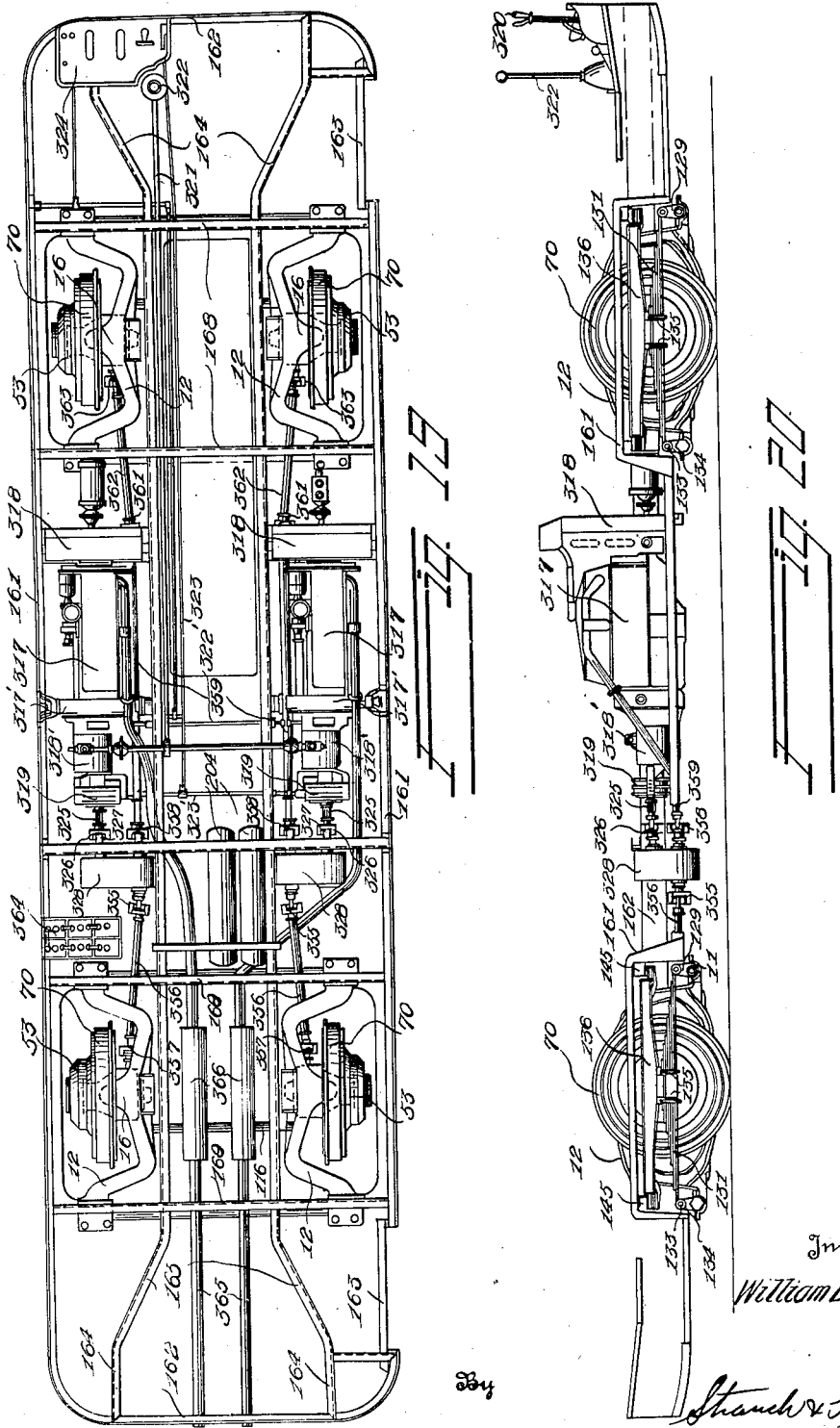
Inventor
William B. Fageol
By
Strauch & Hoffman
Attorneys

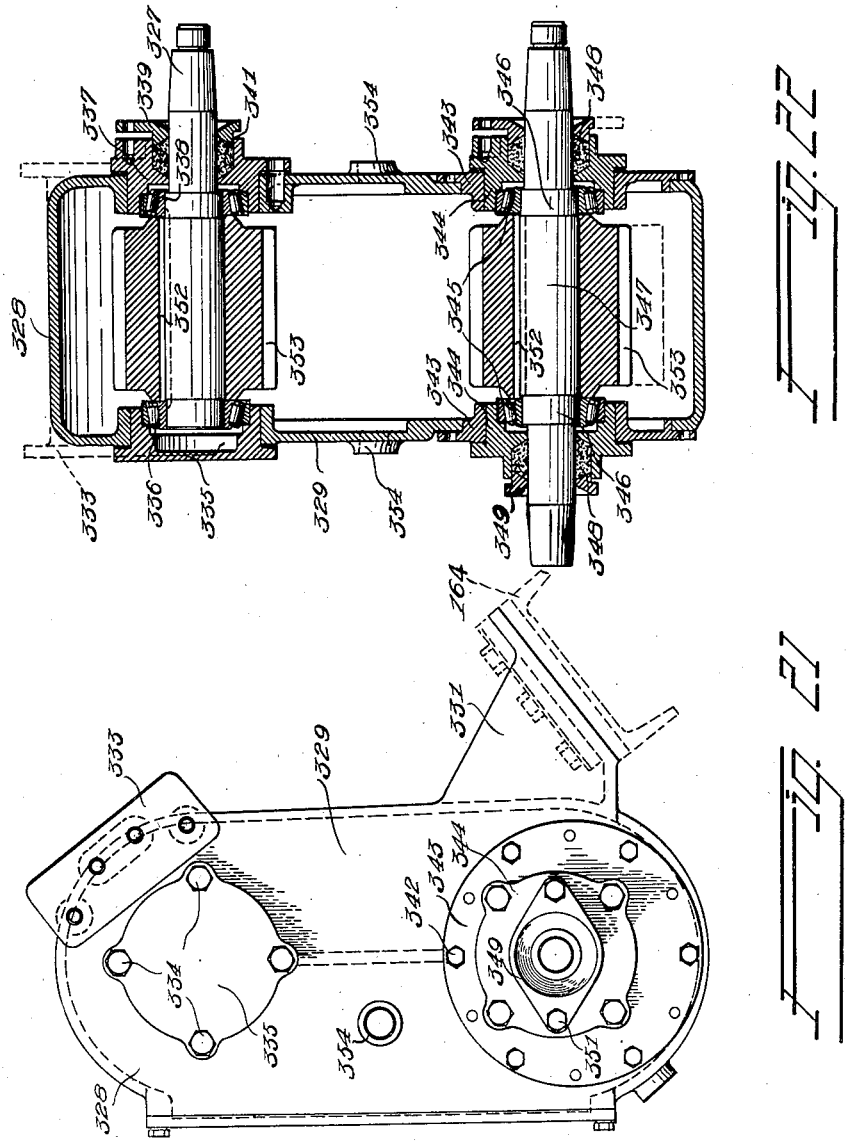

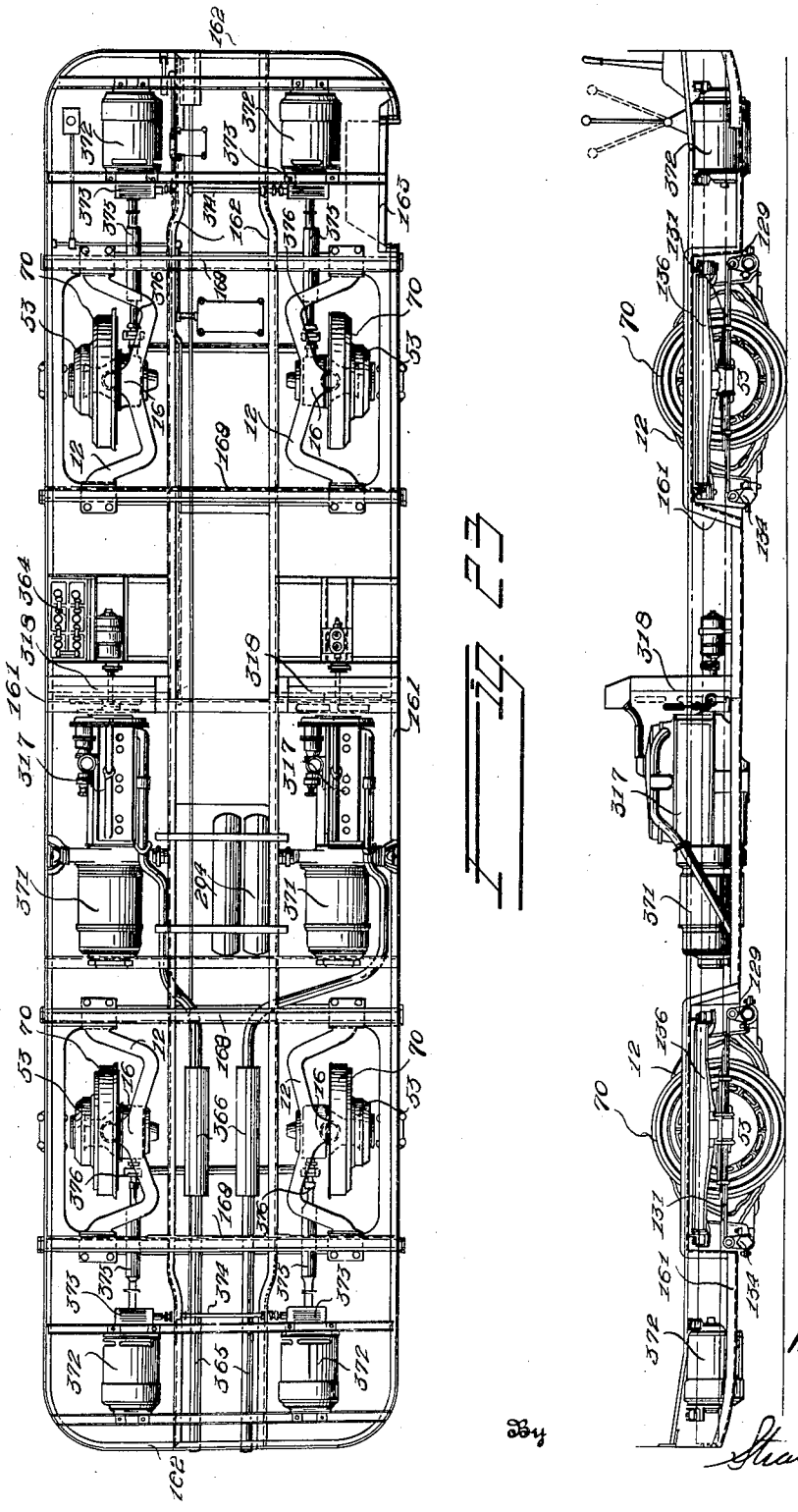

Oct. 4, 1932.  W. B. FAGEOL  1,880,953
RAIL CAR CONSTRUCTION
Filed Feb. 13, 1929   15 Sheets-Sheet 12
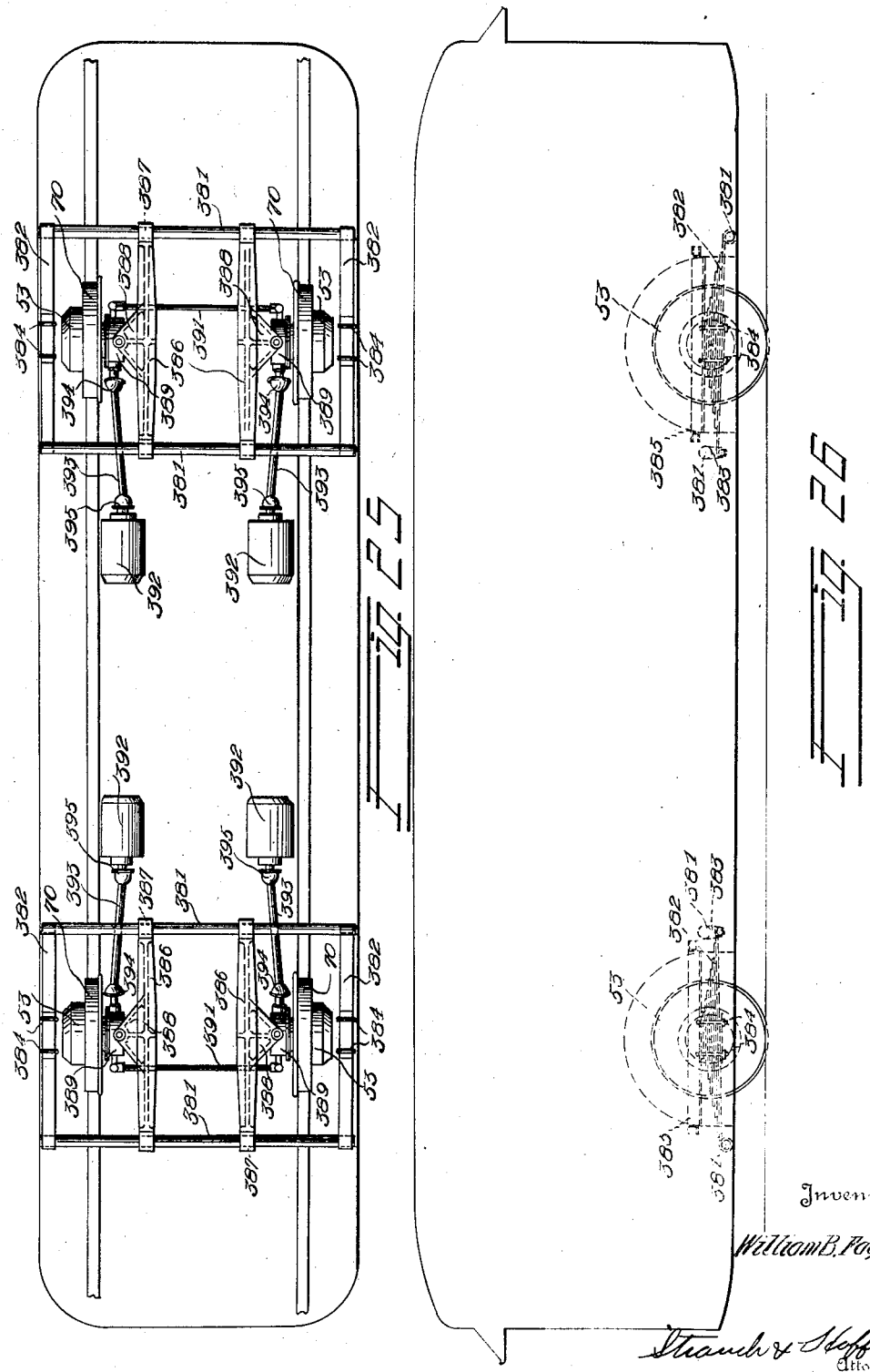
Inventor
William B. Fageol
Strauch & Hoffman
Attorney

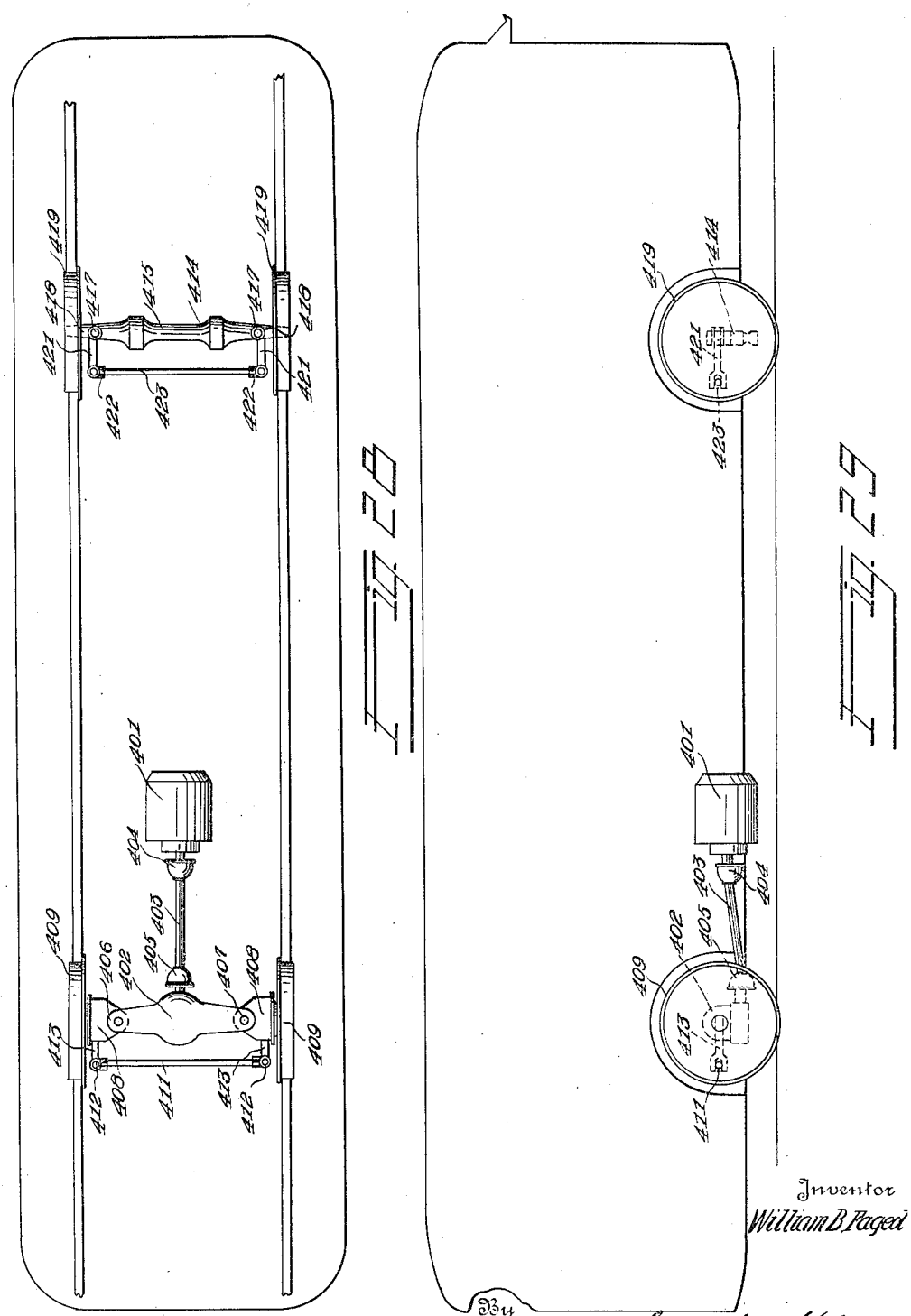

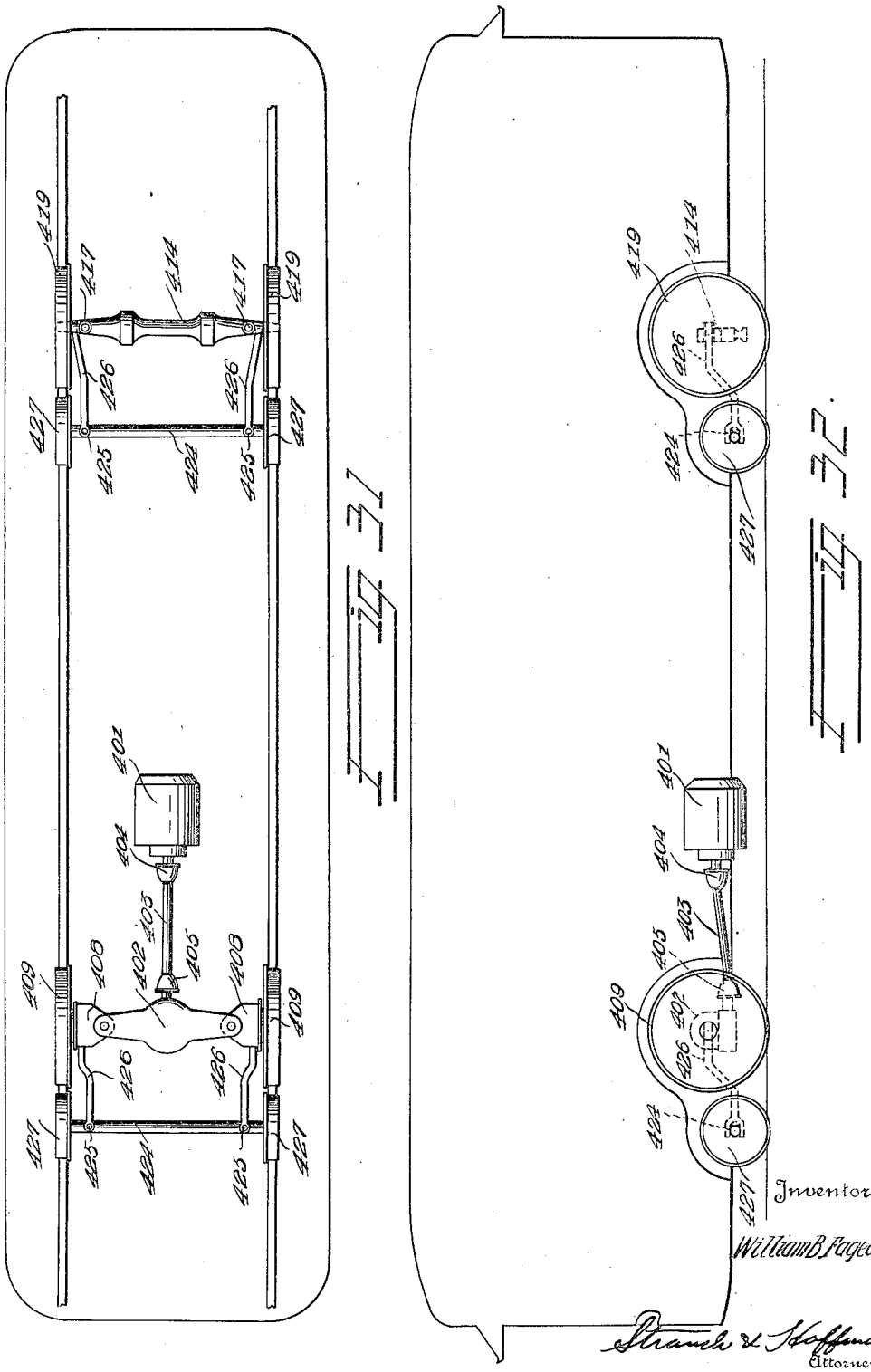

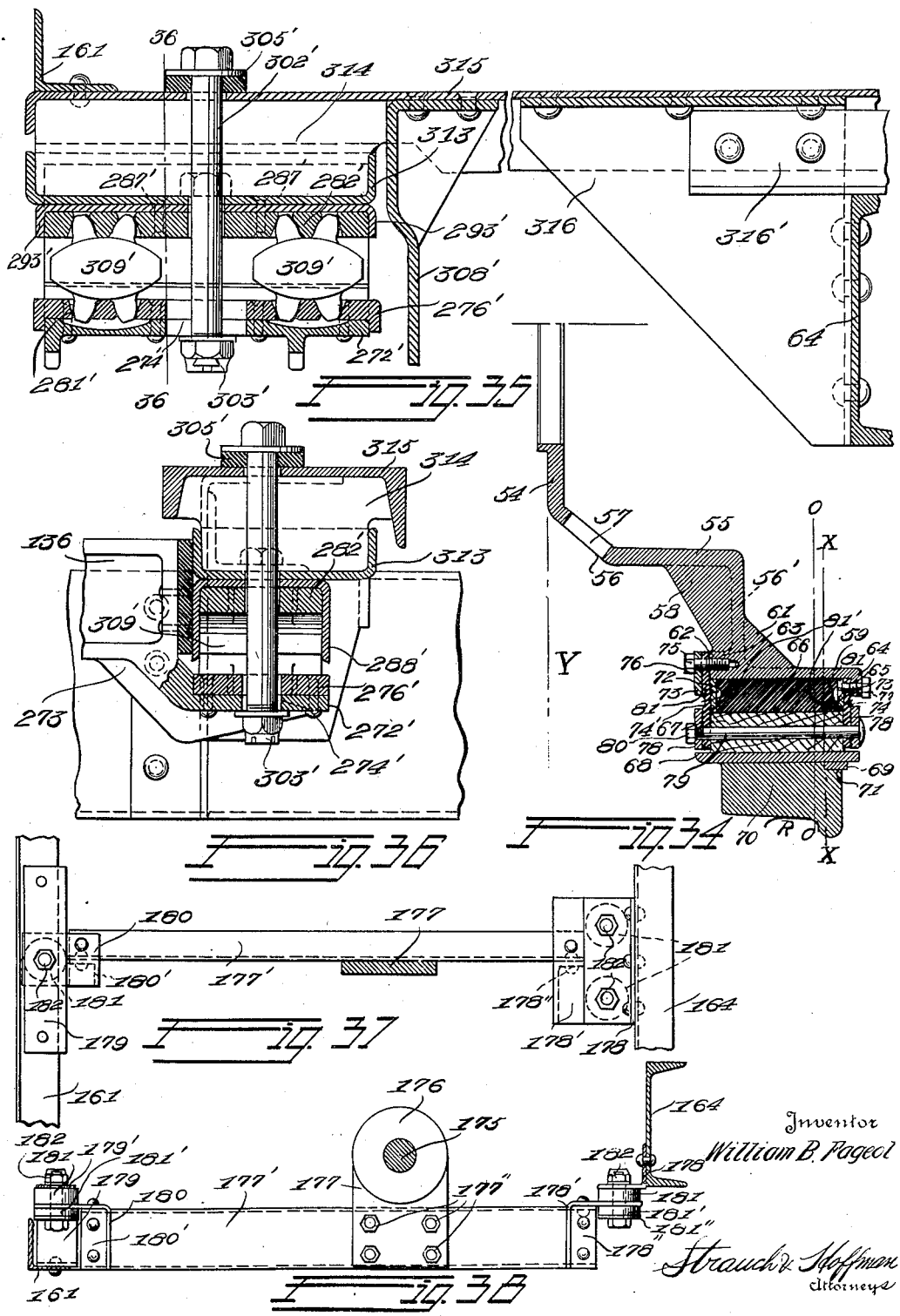

Patented Oct. 4, 1932

1,880,953

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

RAIL CAR CONSTRUCTION

Application filed February 13, 1929. Serial No. 339,720.

The present invention relates to motor driven vehicles and more particularly the invention relates to motor driven rail cars, street cars, and the like vehicles especially adapted for service on rail roads.

In rail and street cars now in general use it is the general practice to support the body of the car on pivoted trucks each comprising a plurality of axles in order to provide cars that will turn on the relatively short curves met in practice and at the same time be of sufficient carrying capacity to permit reasonably economical operation under modern competitive conditions with automobile and bus transportation. Such constructions are necessarily of heavy construction to withstand the impacts and vibrations set up in rail service by the metallic contact of the wheel flanges with the rails in operation. They are further more subject to heavy maintenance costs in operation, and because of their noisy character due to their weight and an absence of cushioning arrangements, are objectionable in city operation with the result that considerable difficulty is experienced by street railway companies in securing urban franchises for track extensions with the advent of the more quiet, lighter, and more flexible passenger carrying bus services developed in recent years.

While light weight and low cost two axle four wheel street cars have been heretofore proposed in an effort to provide lower cost street cars for city street railway service, because of the necessity for making short turns particularly in city streets, such prior proposed two-axle car constructions have been necessarily constructed with a short wheel base to permit operation over the short curves met in practice. As a result such cars have been of such small size that their use in ordinary city or interurban transportation has been impractical because of their limited carrying capacity. In order to provide reasonable carrying capacity the heavier, noisier, and more expensive cars with their disadvantages are now in general use. Because of the truck constructions used, the street car bodies have generally had a relatively high floor line, making the loading and unloading of passengers difficult and time consuming so that the service is slow. Such bodies as are now in general use, are less comfortable than the more modern seating arrangements of improved passenger carrying buses. The comfort and quietness in the operation of buses is due in large measure to the resilient nature of the wheels, while in rail car constructions generally no attempt is made to provide cushioned wheels.

The resultant disadvantages of the heavier rail car operation as compared to bus operation have in many instances forced railway companies to operate bus service, and in some instances has caused complete discontinuance of the rail service by smaller utilities companies. Where combination bus and rail service has been adopted the service and maintenance requirements for operation have been multiplied due to the necessity of maintaining separate service organizations and parts for the road and rail rolling stock. The bus parts now in use are substantially different from the rail car parts and of considerably lighter construction, the difference being occasioned by the fact that the buses are operated on cushioned wheels as just stated, and therefore are not subject to the stress reversals and impacts transmitted to rail car parts by reason of the metallic contact of the wheel flanges with the rails. The degree of such stresses is of course, dependent upon the weight of the car.

I have discovered that by providing properly arranged and cushioned, dirigible or steering wheels under both the forward and rear end of rail cars, that a four wheel rail car utilizing light automotive parts, and of comparatively long wheel base can be provided, with tractive effort and passenger carrying capacity equal to the capacity of the ordinary heavy and noisy eight wheel street cars, now in common use. In this manner I provide a practical modern street or rail car, with a comfortable bus body arrangement, and with parts approximately eighty percent interchangeable with buses of equal passenger carrying capacity, having only four wheels, which car is of light weight, strong and durable construction, low in initial and operating costs and which permits very economical operation in conjunction with improved buses of generally similar construction, and is operable on the shortest turns met in street railway practice.

While some previous efforts have been made to cushion rail wheels in order to eliminate noise, such prior arrangements have not heretofore been satisfactory in high speed modern operation. The reason for such prior failures has apparently been the failure to provide properly proportioned and constructed cushion arrangements that will withstand the shocks, stresses and strains on such proposed constructions in operation and at the same time to provide satisfactory cushioning with a reasonable length of life of the cushion. I have found in practice that if rubber cushions in rail wheels are not of correct composition and proportions excessive side sway of the car in operation is permitted, effective braking cannot be provided, and practical operation in modern railway service becomes impossible. By utilization of my improved cushion wheels, destructive vibration and undesirable noises may be eliminated, and I am enabled to use comparatively light automotive drive axle and braking constructions in rail cars. At the same time the cars constructed in accordance with this invention are exceptionally comfortable to the passengers.

A primary object of the present invention is therefore to provide improved, comparatively light, and low cost rail cars with comfortable bus seating arrangements for a comparatively large number of passengers, in which automobile body, drive and braking arrangements are utilized, whereby the parts may be made largely interchangeable with bus parts of substantially equal passenger carrying capacity, thereby reducing the initial cost of manufacture and the combined operation of rail and bus or road vehicle equipment by railway and public utility service corporations.

Another object of my invention is to provide a rail car in which the body is of a relatively light yet strong structural formation, and is adapted to support the motors and various control devices, thereby permitting the use of comparatively light single axle wheel supporting truck assemblies, and with individual steering wheel arrangements applied to all of the wheels so as to permit the use of a long wheel base though the road may contain short curves.

Still another object of the invention is to provide four wheel rail cars of automotive type construction comprising a body, power, and driving mechanism supported by the body in balanced relation over the wheels so as to provide effective tractive effort for high speed operation and braking purposes in cars having full load passenger carrying capacity of up to one hundred or more passengers.

A further object of the invention is to provide a rail car comprising a single axle truck assembly with novel frame and steering wheel arrangements.

Another object of the invention is the provision of a rail car in which the usual heavy truck frame structures are eliminated, and in which the wheels are mounted in pairs for pivotal movement, whereby the floor of the body may be brought much closer to the ground and the center of gravity of the car maintained at a very low point.

Still another object of the invention is the provision of a rail car comprising a pair of single axle truck assemblies including resilient flanged wheels, and a body yieldingly supported by said truck assemblies, so that the truck frames are yieldingly supported on the wheels and the body yieldable in a plurality of directions with respect to the frame.

A further object of my invention is the provision of novel cushioning arrangements for rail vehicles that absorb vibrations, deaden noises and permit the use of comparatively light automobile driving braking and body constructions for rail services at comparatively high speeds and with large passenger carrying capacities.

A still further object of the invention is the provision of novel rail car constructions so arranged as to permit the adjustment of the wheel treads to fit varying gauges of track whereby standardized manufacture of parts may be carried forward and the gauge of the car may be readily adjusted to fit the track upon which the car is to run.

A still further object of the invention is the provision of a novel cushioned wheel mounting and brake assembly for rail service that deadens shock and vibration and permits quiet high speed operation.

A still further object of the invention is to provide a rail car including dirigible wheels in which the wheels are so mounted that they tend at all times to maintain a straight position without lateral oscillations or vibrations and that automatically tend to return to a straight position after being moved the from when the car moves around a curve.

Other objects of the invention and the means by which the above enumerated objects are accomplished, as well as the advantages derived therefrom will be referred to in the course of the following description, and are such as may be attained by a utilization of the various combinations and subcombinations hereinafter set forth in the various relations to which they are obviously adapted as defined by the terms of the appended claims.

For a more complete understanding of the invention references will be had to the accompanying drawings forming a part of this application, and in which:

Figure 1 (Sheet 1) is a top plan view of the chassis of a preferred embodiment of my invention disclosing the wheels, power mechanism and associated control means.

Figure 2 (Sheet 1) is a side elevational view of the structure illustrated in Figure 1.

Figure 3 (Sheet 2) is a fragmental side elevational view of an enlarged scale disclosing one side of one of the single truck assemblies and means for association of the body supporting base frame construction therewith, the supporting spring being illustrated under load.

Figure 4 (Sheet 3) is a top plan view on an enlarged scale of one of the truck assemblies with a fragmental portion of the base frame construction supported thereon.

Figure 5 (Sheet 4) is a perspective view of one of the truck assemblies.

Figure 7 (Sheet 6) is a substantially vertical sectional view through the construction shown in Figure 6 with the housing shown in elevation and disclosing the pivotal steering connection between the housing and the adjacent bolster.

Figure 8 (Sheet 3) is a transverse sectional view through one end of one of the spring supported frame supporting bars disclosing a cushion connection between the bars and frame construction in a preferred form of invention.

Figure 9 (Sheet 3) is a section taken substantially on the plane indicated by line 9—9 in Figure 8.

Figure 10 (Sheet 7) is a top plan view diagrammatic in nature, disclosing the seating arrangement within the car body.

Figure 11 (Sheet 7) is a side elevational view of the car body disclosing the seating arrangement, window and door construction and a preferred trolley collector supported on the roof of the body of a preferred form of my improved electric street cars.

Figure 12 (Sheet 6) is a side elevational view on an enlarged scale of a preferred collector assembly base construction.

Figure 13 (Sheet 6) is an end elevational view of the construction illustrated in Figure 12 with parts shown in transverse section.

Figure 17 (Sheet 4) is a transverse sectional view illustrating a modified arrangement of the yieldable connection between the spring supported bars and the base frame construction.

Figure 18 (Sheet 4) is a section taken substantially on a plane indicated by line 18—18 in Figure 17.

Figure 19 (Sheet 9) is a top plan view of the chassis of a modified construction wherein the drive wheels at each side of the car are driven by an internal combustion motor.

Figure 20 (Sheet 9) is a side elevational view of the construction illustrated in Figure 19.

Figure 21 (Sheet 10) is an end elevational view of one of the sprocket housings disclosed in Figure 19.

Figure 22 (Sheet 10) is a central vertical sectional view through the housing disclosed in Figure 21.

Figure 23 (Sheet 11) is a top plan view of the chassis of a still further modification of the invention embodying a gas-electric drive arrangement.

Figure 24 (Sheet 11) is a side elevational view of the construction illustrated in Figure 23.

Figure 25 (Sheet 12) is a more or less diagrammatic view in top plan of a further modification of the invention.

Figure 26 (Sheet 12) is a side elevational view of the construction illustrated in Figure 25.

Figure 28 (Sheet 13) is a diagrammatic view in top plan illustrating a further modification of the invention embodying a dead axle, a drive axle, and a motor operatively connected with the drive axle.

Figure 29 (Sheet 13) is a side elevational view of the construction illustrated in Figure 28.

Figure 30 (Sheet 3) is a diagrammatic front elevational view of the construction illustrated in Figs. 28 and 29.

Figure 31 (Sheet 14) is a view similar to Fig. 28 disclosing a modified arrangement embodying pony wheels carried by axles pivotally supported from arms carried by the wheels pivotally connected to the dead and drive axles.

Figure 32 (Sheet 14) is a side elevational view of the construction illustrated in Figure 31.

Figure 33 (Sheet 2) is a diagrammatic plan view illustrating a train of cars constructed in accordance with one of the embodiments of my invention.

Figure 34 (Sheet 15) is a transverse sectional view of the preferred improved cushioned wheel tread construction.

Figure 35 (Sheet 15) is a view similar to Figure 17, (Sheet 4) disclosing a preferred form of yieldable connection between the spring supported bars and the base frame construction.

Figure 36 (Sheet 15) is a section taken substantially on a plane represented by line 36—36 in Figure 35.

Figure 37 (Sheet 15) is a broken top plan view disclosing the yieldable connection between the base frame construction and one of the mid-ship bearings forming a part of my invention.

Figure 38 (Sheet 15) is a transverse section of a portion of the base frame construction, showing one of the mid-ship bearings and support therefor in elevation and a portion of a drive shaft associated therewith in transverse section.

Reference will now be had to the accompanying drawings for a detailed description of the invention in which like parts are designated by like reference characters.

Figure 6:
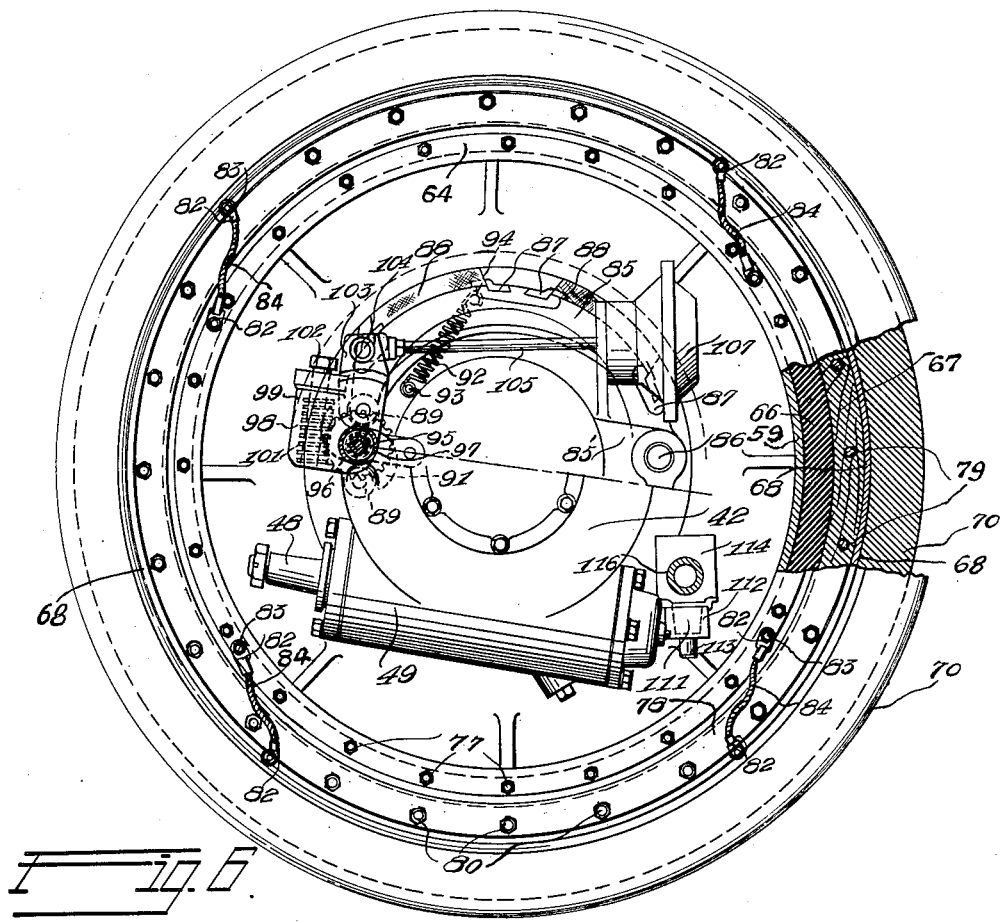
Figure 6 (Sheet 5) is a side elevational view partially in longitudinal section of one of the wheel and wheel housing constructions, particularly illustrating the wheel tread construction and a preferred braking arrangement.
Figures 14, 15:
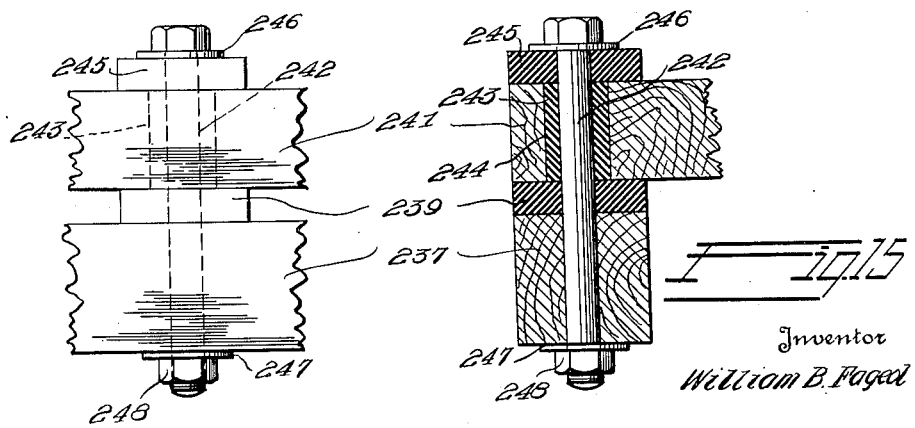
Figure 14 (Sheet 5) is a fragmental side elevational view on an enlarged scale of the construction illustrated in Figures 12 and 13.
Figure 15 (Sheet 5) is a transverse sectional view of the construction illustrated in Figure 14.

Referring first to Figures 1 to 15 inclusive, in which is disclosed a preferred embodiment of my invention, 10 designates one of the single axle truck assemblies on which the body of the car is supported as hereinafter set forth. Each truck assembly 10, as illustrated in detail in Figs. 3, 4 and 5, comprises a pair of spaced parallel shafts or spacing rods 11 to which are connected adjacent the opposite ends thereof, the ends of side frame castings 12 each of which is of skeleton formation as illustrated in Fig. 3. Each of the side frames 12 is detachably connected to the ends of rods 11 through the instrumentality of a two part end portion comprising a bottom integral extension 13 and a cap member 14 detachably and adjustably secured to extension 13 by means of bolts 15 whereby the distance between side frames 12 can be varied at will upon loosening bolts 15, and moving side frames 12 along rods 11 and thereafter tightening bolts 15. Each side frame 12 comprises upper and lower trunnion supporting brackets 16 and 17 respectively, the latter of which is preferably detachably secured to frame 12 by bolts as indicated at 18 (Fig. 7) for ready assembly and disassembly as well as facilitating the interchanging of parts. Bracket 16, as indicated in Fig. 7 is provided with a recess 19 in which is disposed a bearing sleeve 21 provided with an inner flange 22 engaging bracket 16 at the inner end of recess 19. Bearing sleeve 21 cooperates with a sleeve 23 in engagement with a trunnion 24 which is provided with a reduced portion 25 about which is disposed a roller bearing assembly 26 which cooperates with trunnion 24 and bracket 16 within the outer portion of recess 19. A suitable oil cup or "alemite" connection 27 may be provided in bracket 16 for conveniently lubricating bearing 26.

Lower bracket 17 is centrally apertured as indicated at 28 and provided with a bearing sleeve 29 for cooperation with a similar sleeve 31 on a trunnion 32, the outer end of which is threaded as indicated at 33. Aperture 28 is enlarged as indicated at 34 providing a shoulder 35 to the surface of which is secured by means of pins 36, a plate 37 which is centrally apertured for reception of the outer end of sleeve 31. Surrounding trunnion 32 in engagement with plate 37 is a lubricant carrying member 38 which is maintained in position by a washer 39 engaged by a nut 41 which threadedly engages the threaded section 33 of trunnion 32.

Trunnions 24 and 32 are disposed in vertical alinement and are rigidly supported by a housing 42 which is in accordance with the construction described capable of swinging movement relative to brackets 16 and 17 by the pivotal connection therewith through trunnions 24 and 32. Housing 42 is provided with spaced roller bearing assemblies 43 and 44 in which is rotatably journaled a shaft 45 to which is splined a worm gear 46 adjacent bearing 43 in meshing engagement with a worm 47 secured to shaft 48 (Fig. 7) which, as indicated in Fig. 6, is rotatably journaled in a cylindrical extension 49 of housing 42 in an inclined position for a purpose hereinafter set forth. Shaft 45 at the end opposite the end which carries gear 46 is provided with a disk head 51 to the margin of which is detachably secured by means of bolts 52, a wheel construction 53, which comprises a vertically disposed flange portion 54 through which bolts 52 extend, and a cylindrical portion 55 connected to flange portion 54 by a conical portion 56 provided with apertures 57 permitting the flow of cooling air to the parts housed by the wheel. Cylindrical portion 55 defines an internal brake drum and at the inner end thereof merges into a vertically disposed web portion 56′ provided with apertures 57′, admitting cooling air, and reinforcing ribs 58 integrally unite portions 55 and 56′. Web portion 56′ merges into a flange or inner rim portion 59 disposed at right angles to web portion 56′ and is reinforced by ribs 61 integrally uniting portions 56′ and 59 opposite ribs 58. Inner rim 59 at the outer edge thereof at its juncture with web 56′ is provided with an overhanging substantially thickened portion 62 provided with screw taps 63. The inner edge of rim 59 is provided with an integral outwardly directed flange 64 provided with fastener apertures 65.

Disposed in engagement with rim 59 is a rubber cushion member 66 of substantial thickness and of less width than that of rim 59 and surrounding member 66 in engagement therewith is a rigid cushion engaging and confining rim member 67 which is preferably constructed of wood. Surrounding member 67 is an outer metallic rim member 68 which is secured to the outer surface of member 67 against any possible movement relative thereto as by force fitting.

Secured to the outer face of member 68 adjacent the inner edge thereof is a metallic stop shoulder ring 69 which is preferably secured to member 68 by shrinking thereon and spot welding at opposite edges thereof at the junction with member 68.

A flanged rail engaging tread member 70 is shrunk on the outer cylindrical surface of member 68 with a circumferential laterally opening recess 71 on the inner periphery thereof for engagement with member 69. Disposed within a recess 72 on each side of rubber cushion member 66 is a relatively rigid ring member 73 which is of less width than the radial thickness of member 66 for permitting yielding thereof, the recesses 72 and ring members 73 being of such depth and thickness respectively that the outer surfaces of ring members 73 are flush with the opposite lateral faces of member 67 with the material of member 66 projecting outwardly between member 67 and the outer peripheries of ring members 73 flush with the lateral surfaces thereof, thus providing opposite plane lateral surfaces defined by member 66, ring members 73 and member 67. Disposed against the outer face of inner ring member 73 with the inner edge thereof disposed between and in engagement with ring member 73 and flange 64, is a member 74 constructed of a high quality of laminated rubber, the layers thereof being about 1/16 inch thick and moulded together into a homogeneous mass. Member 74 rests against the corresponding side of member 67 with the outer periphery thereof spaced slightly inwardly of the inner surface of member 68 as indicated.

Disposed against the outer faces of member 67 and outer ring member 73 is a similar member 74' which projects inwardly in lapped relation to thickened portion 62 of inner rim 59 to which it is secured by bolts 75 which extend therethrough as well as through a relatively rigid ring member 76. Ring members 73 are secured to flange 64 and ring member 76 respectively, by screw bolts 77, the conical heads of which are counter sunk into rings 73, and it will be noted that in assembly of the parts, the inner screw bolts 77 are first drawn up tight, clamping the inner edge of member 74 tightly between flange 64 and the ring member 73 prior to the positioning of rubber cushion member 66 on rim member 59.

Disposed against the outer faces of members 74 and 74' with the outer edges thereof flush with the outer edges of members 74 and 74' and with the inner edges thereof in spaced relation to the outer edges of flange 64 and ring member 76 respectively, are ring members 78, and ring members 78 are secured to members 74 and 74' and member 67 by transversely disposed through bolts 79 for drawing ring members 78 toward each other through nuts 80 and tightly binding the outer edges of members 74 and 74' between member 67 and ring members 78.

The outer screw bolts 77 are drawn up tightly clamping the inner edge of member 74 between ring members 73 and 78 prior to the connection of member 74' and ring member 76 to inner rim 59 by bolts 75, thus facilitating the assembling operations.

Rubber cushion member 66 is preferably recessed at each side thereof as indicated at 81 for providing a better cushioning action by flow of the rubber into the recesses upon compression thereof, member 74' is recessed on the outer lateral surfaces thereof as at 81' (Figure 34) between the inner edges of ring members 78 and the outer edges of flange 64 and ring member 76 respectively for providing for the flow of the material without pinching thereof upon relative radial movement between ring members 78 and flange 64 and ring 76 respectively.

In the wheel construction above described, shocks are absorbed by the rubber cushion member 66. Ring members 73, which normally project slightly outwardly of the inner edges of ring members 78, prevent side sway of the vehicle due to the yieldable nature of the rubber cushion member 66 without interfering with the capacity of cushion member 66 to undergo vertical yielding or for absorbing shocks occasioned by irregularities in the roadway. It will further be seen that the construction described permits of an expeditious assembly, disassembly and replacement of parts.

In order to prevent lateral movement of the car when in motion it is necessary that tread members 70 be mounted in accurate parallelism with respect to the bolt on faces of the hub members, which is accomplished, as indicated in Fig. 34, Sheet 15, by machining the outer lateral face of stop shoulder ring 69 for lining up laterally with the hub face.

By accurately machining the face of ring 69, such that the plane thereof designated by line X—X is parallel with the plane of the bolt—on face of the wheel hub, designated by line Y and shrinking tread 70 on member 68 with the lateral face of recess 71 in engagement with the machined face of ring 69, tread 70 will run true, thus preventing possible lateral movement of the car due to inaccurate positioning of the tread surfaces with respect to the ends of the axles.

As the wheel constructions described are adapted for rotation by electric motors which receive their source of electric energy through a trolley similar to street cars now in common use it is necessary that a complete circuit be established by grounding through the rails on which the car travels. As rubber is a non-conductor it is necessary to put rim member 59 and tread member 70 into electrical connection. Accordingly, clip members 82 (Fig. 6) are secured to flange 64 and member 68 by bolts 83 and said members 82 are connected by short cables 84 providing bonds between rim member 59 and tread member 70.

Due to the lateral spacing of rings 73 and 78, members 74 and 74' permit a slight lateral flexing as cushion member 66 is deformed by irregularities in the road-way. Cushion member 66 supports most of the vertical load, and members 74 and 74' serve to transmit the torque and braking forces from rim member 59 to the tread member 70 or vice versa.

Carried by each of the wheel constructions within drum 55 is a brake construction comprising a pair of brake shoes 85 pivotally supported at adjacent ends from a lug 85' integral with housing 42 by means of a pintle 86. Each of the shoes 85 has secured to the outer face thereof by means of clips 87 brake lining sections 88 which, as shown, have the ends in spaced relation to provide for circulation of air through apertures 57 thus preventing excessive heating upon application of the brakes. The free ends of shoes 85 are provided with rollers 89 which are maintained in engagement with a cam member 91 by means of coil springs 92, one end of each of which is secured to housing 42 as indicated at 93. The opposite or outer ends of said springs are connected to shoes 85 as indicated at 94. Cam 91 is secured to one end of a shaft 95 rotatably journaled in housing 42 and fixed to the opposite end of shaft 95 is a worm wheel 96. Rotatably journaled on shaft 95 is the cylindrical hub portion 97 of a rotating and adjusting member 98 comprising a cylindrical member 99 provided with a bifurcation for the reception of wheel 96. Journaled in cylindrical member 99 is a screw 101 operatively engaged with the worm wheel 96, the screw 101 being provided with an angular tool engaging head 102 for rotation of screw 101 (Fig. 7). Formed integrally with cylindrical member 99 are laterally spaced ears 103 between which are pivotally connected by means of a pintle 104 one end of a brake actuating rod 105 which extends through an opening 106 in housing 42 with the opposite end thereof operatively connected with a brake operating chamber 107, the brake operating chambers as in common practice, being in communication with a main pneumatic cylinder. A suitable lubricating duct 110 is provided for lubricating shaft 95.

The brake construction just described provides a quick and accurate adjustment as by turning the screw 101 shaft 95 will be rotated through wheel 96 which in turn will rotate cam 91 to alter the distance between rollers 89 and consequently move the brake lining sections 88 toward or from the brake drum 55 and when the brakes are applied rods 105 will impart rotation to member 98 which, through engagement of wheel 96 and screw 101 will impart a corresponding rotation to shaft 95 and consequently cam 91 which will force rollers 89 apart against the action of springs 92 and force the brake lining sections 88 into frictional engagement with brake band 55.

Rigidly secured to each of the housings 42 is an arm 111 which at the free end thereof is provided with a bearing socket 112 in which is rotatably disposed a trunnion 113 of a block 114. Detachably connected to the opposite blocks of each pair of housings 42 by means of bolts 115 are the opposite ends of a steering tie rod 116 which functions to maintain each pair of wheels in parallelism.

In the construction disclosed the wheels 53 of each truck assembly 10 are capable of turning or steering movement with respect to side frames 12 and are, by means of rod 116, maintained in parallelism in their steering movement but upon encountering a straight section of the track immediately after rounding a curve it is necessary, for most efficient operation, that the wheels immediately assume a position parallel with the straight section of track. Accordingly, a pair of yieldable members 117 (Fig. 5) are provided, each comprising a relatively strong helical spring 118 with one end thereof detachably connected to tie rod 116 adjacent each of the opposite housings 42. Each of the yieldable members 117 further comprises a rod 119, one end of which is connected to the other end of each of springs 118. The opposite ends of rods 119 are adjustably connected to vertical uprights 121 connecting the opposite portions of side frames 12. The members 117 thus connected, are disposed in crossed relation as indicated in Figs. 1 and 5 and through springs 118 tend to maintain wheels 53 parallel with the car body and act to automatically pull the wheels back to a straight parallel position immediately after rounding a curve.

While the yieldable members 117 above described tend to maintain the wheels in a straight parallel position and act to minimize flutter of the wheels, in order to still more effectively prevent flutter of the wheels a shock absorber 122 may be provided as indicated in Figs. 1 and 5, and which, as shown, has the cushioning chamber 123 thereof detachably secured to one of the rods 11 by means of U bolts 124 and having the angularly disposed pivotally connected arms 125 and 126 extending inwardly towards steering rod 116 with the free end of arm 126 pivotally connected to an arm 127 rigidly secured to rod 116 adjacent one end thereof.

The chamber 123 contains mechanism whereby a yielding resistance is imposed to movement of the arm 125 in either direction from its central position and to yieldingly urge said arm toward said position when moved therefrom. Such shock absorbers are per se well known in the art. When used in the relation just described, member 122 serves to dampen any vibration or flutter of the wheels connected together by the tie rod 116.

Keyed to the opposite ends of one of shafts 11 outwardly of side frames 12 are brackets 129 to which the corresponding ends of leaf springs 131 are pivotally secured by means of pintles 132 and the opposite ends of springs 131 are pivotally secured by pintles 133 to shackles 134 rotatably mounted on the opposite ends of the other shaft 11 of each track assembly 10. Detachably secured to the intermediate portions of springs 131 by means of U bolts 135 are the intermediate portions of supporting bars 136. Each of the bars 136 is provided at each end thereof with a depressed seat extension 137 inwardly flanged at 138 and defining with the body of bar 136 a vertical wall 139. Disposed on each of the seats 137 (Fig. 9) is a rubber insulator 141 comprising downwardly extending flanges 142 in engagement with flanges 138 and an upwardly extending flange 143 in engagement with wall 139.

Connecting corresponding opposite ends of bars 136 are channel members 145 each comprising an inner member 146 and an outer member 147, the outer member 147 of each of the members 145 being provided at each end thereof with a downwardly extending flange 148 engaging the outer surface of the outer flange 142 of the respective insulator 141 and provided inwardly of flange 148 with a flange 149 engaging the outer surface of the other flange 142 of the respective insulator 141. Each of the seats 137 is provided with a pair of laterally spaced apertures 151 (Fig. 8) and members 145 are provided with spaced apertures 152 in vertical alinement with apertures 151. Seated in apertures 151 and 152 in engagement with insulator 141 are the hub portions 153 of rubber or similar insulating washers 154 engaging the respective opposite surfaces of seats 137 and members 145. Extending through alined apertures in each vertical pair of washers 154 and insulator 141 is a bolt 155 provided with a clamping nut 156, metallic washers 157 and 158 being interposed between washers 154 and the heads of bolts 155 and the nuts 156 respectively.

The members 145 form the connection between the truck assemblies 10 and the body hereinafter described and the insulators 141 in combination with the washers 154, provide a resilient connection between bars 136 and members 145 allowing for a slight universal relative yielding movement between bars 136 and members 145 to which the body is secured for partly absorbing shocks applied to the trucks without transmitting them to the frame. At the same time a cushioned support for the body is provided.

In order to provide rigidity to the truck units and allow same to move laterally as a unit, the opposite bars 136 of each truck assembly 10 are connected by transverse tie bars 159 (Figs. 1, 4 and 5) with the opposite ends thereof connected to bars 136 by U-bolts 160 inwardly of members 145. The tie bars 159 connect the opposite bars 136 for unitary lateral movement and the cushion connection between bars 136 and members 145 permit a yieldable movement of the body which is supported on members 145, relative to the truck assemblies.

A pair of truck assemblies 10 provided with the members 145 are secured in suitably spaced relation by means of a relatively light base frame construction that is formed to provide means for attachment of the motors and associated control elements and also as a base for the body construction hereinafter described. Said base frame construction comprises a pair of laterally spaced centrally depressed angle beams 161 which at the opposite ends of the depressed portions thereof extend over bars 136 in contact with members 145 and secured thereto. One of the beams 161 is continued beyond the respective bars 136 and bent laterally at opposite ends thereof to provide end portions 162 and the other beam 161 terminates adjacent the opposite ends of the respective bars 136 and is connected with the opposite end portions 162 by door space members 163.

Extending parallel with beams 161 intermediate thereof in transversely spaced relation, and arranged below members 145, are a pair of channel members 164 having the opposite ends thereof outwardly diverged as indicated at 165 merging into substantially short parallel longitudinally extending terminal portions 166.

Extending over members 164 and 161 are floor sills 168 and a pair of transversely extending channels 170 are disposed intermediate sills 168 and are supported at opposite ends thereof by gussets 171 extending upwardly from the beams 161. Disposed between sills 168 and channels 170 and parallel therewith are transversely extending members 172 providing additional supporting means.

Suitably secured to diverging portions 165 of members 164 are the inner ends of draft members 172'. Secured to members 170 in transversely spaced relation and substantially symmetrical with respect to both the transverse and longitudinal center lines of the base frame construction are a pair of electric motors 173 each of which drives the front and rear wheels 53 through worm shafts 48 at the respective side of the frame by a pair of oppositely extending drive shafts 174.

Each drive shaft as indicated in Fig. 1, comprises a longitudinally disposed section 175 one end of which is connected to motor 173 by a universal joint 175' and the opposite end of which extends through a mid-ship bearing 176 which, as indicated in Figs. 37 and 38 Sheet 15 is supported by a bracket 177 secured to a supporting channel 177' by bolts 177''. Secured to the adjacent channel 164 is the vertical leg of an L-bracket 178 whose horizontal leg is in vertical spaced relation to the horizontal leg of the bracket 178' secured to the adjacent end of channel 177' by means of an integral extension thereof as indicated at 178''. Secured to the adjacent beam 161 are the opposite end feet of a U-bracket 179 and disposed in inwardly vertical spaced relation to the bight portion 179' of bracket 179 is the horizontal leg of a bracket 180 secured to the opposite end of channel 177' by an integral extension 180', channel 177' is yieldably supported at one end thereof from channel 164 by interposing a pair of spaced yieldable apertured disk members 181 (preferably constructed of rubber) between the vertically spaced horizontal legs of brackets 178 and 178' and a pair of similar disk members 181' below the horizontal leg of bracket 178' in vertical alinement with disk members 181, the disk members being secured between the horizontal legs and washers 181'' engaging the inner faces of members 181' by bolts 182 and channel 177' at the opposite end thereof is yieldably supported from beam 161 by a single pair of disk members 181 and 181' with disk member 181 interposed between the bight portion 179' of bracket 179 and the horizontal leg of bracket 180.

Each shaft section 175 adjacent the midship bearing 176 is flexibly connected by a universal joint 183 to one end of an angularly disposed telescoping shaft section 184 which at the opposite end thereof is connected with the worm shaft 48 by a universal joint 185.

By the provision of the mid-ship bearing 176, the drive shafts are restrained against swirling or whipping action and by yieldably supporting the mid-ship bearings from the base frame construction provision is made for weaving action of the frame and vibrations are absorbed by the yieldable disk members 181 and 181'.

By this arrangement the front and rear wheels at each side of the car are independently driven by a separate motor whereby the wheels at opposite sides may be automatically driven at different speeds as may be required upon rounding a curve in the track upon which the car is traveling, the pivotal or swivel connections of wheels 53, above described, permitting shifting of every wheel about a substantially vertical axis as the car rounds curves. It will be noted that the pivotal or swivel connections, being substantially in vertical alinement with the rail engaging contact points of treads 70 with the rails R as indicated by the line O—O in Figures 7 and 34 there will be no substantial tendency of the wheels to be urged out of their normal straight position as when traveling on a straight section of track.

Supported by the base frame work as is clearly disclosed in Figure 1 are various control elements similar to standard control elements as now used in connection with trolley cars and are enumerated as follows. Projecting inwardly from member 161 adjacent the front end of the car is a bearing 186 on which is rotatably journaled a sleeve 186' provided with an operating lever 187. Pivotally connected to sleeve 186' is one end of a rod 187' whose opposite end has a leverage connection with a transversely extending rotatable shaft 188 the opposite ends of which are journaled in members 161 and 164 and to the inner end of which one end of the rod 188' has a leverage connection, the opposite end of which has a similar connection with a transversely extending shaft 189 which is journaled in members 164 and adapted for rotation upon manipulation of lever 187. Shaft 189 is provided on the opposite ends thereof with cams for controlling the external brake shoes located on the rear end of each of the electric motors 173 in well known manner.

Supported adjacent operating lever 187 is a safety control device 189' for regulating the control circuit connections to the operating coils of the magnetic contactors which are located in a cabinet 190 at the rear end of the frame as indicated. Control device 189' also connects the trolley potentials to the control resistors and provides safety features in the air braking systems.

Supported at the front end of the frame adjacent control device 189' is a brake valve 191 which controls the application of the brakes through the brake application valve 192 to the four wheels of the car. The handle 193 of valve 191 has a "dead man" feature which makes it necessary for the operator to hold his hand on the lever 193 at all times when the car is in motion, removing the hand from the lever causes an emergency application of the brake.

A door control lever 194 is provided adjacent valve 191 for controlling the front and rear pneumatically operated doors hereinafter referred to and which are so interlocked with the braking mechanism that the doors cannot be opened until the car has come to a full stop.

An electric power reverser 195 is disposed adjacent the control lever 194 for changing the direction of rotation of motors 173.

Disposed between control device 189' and valve 191 is an air brake foot valve 196 for relief of the operator from holding valve handle 193 at all times when the car is in motion.

A variable load mechanism 197 is provided which comprises a bell crank lever 198 provided with a roller 199 contacting a flat plate 201 attached to one of the members 164. As the load increases the body supported by the frame moves downward causing roller 199 to move along plate 201 thereby moving the rod 202 one end of which, is connected to the variable load valve 203 which is connected to one of the compressed air reservoirs 204 which in turn are interconnected as well as being connected to brake application valve 192 which in turn is connected to brake operating chambers 107 carried by housings 42 above referred to. The reservoirs 204 are suitably connected to an air compressor 205 in well known manner. The variable load valve 203 is interconnected with brake application valve 192 and the door operating mechanism so that every time a door is opened to discharge a passenger a new maximum application pressure is established in the braking mechanism to best suit the load within the car thus giving the most advantageous braking effect at all times and preventing the sliding of the wheels when the car is lightly loaded and preventing insufficient braking when the car is heavily loaded.

An air brake relay valve 206 is interposed between brake application valve 192 and brake operating chambers 107. A brake switch 207 is mounted adjacent cabinet 190 for releasing the brakes when the car is run in a reverse direction.

A compressor governor 208 is pneumatically connected to the compressor exhaust line and electrically connected to the electric power motor in the compressor unit. The governor 208 regulates the pressure of air pumped into the reservoirs 204 by cutting the compressor power supply switch "on" and "off" according to the pressure limits to which the governor has been set.

A motor resistor 209 is disposed between the cross members 168 which is used as a rheostat to give the various stages of acceleration when starting the car from a dead stop position.

A control register 211 is mounted adjacent the motor resistor 209 which is a constant resistance remote control to give a lower voltage than is obtainable from the trolley circuit supply current.

The cabinet 190 encloses a motor cutout or control switch 212 for selectively cutting out either one of the motors 173 and an over load trip is also provided in the cabinet 190 for breaking the control circuit upon an overload of current.

The construction so far described provides a chassis adapted to support a body of any suitable or desired construction depending upon the character of the service to be rendered, it being obvious that if it is desired to transport freight or merchandise a suitable body for such transportation will be supported on the chassis, while if it is desired to provide a passenger car a body suitable for the transportation of passengers will be provided. While it is obvious that the chassis construction is well adapted to support any type of body construction it is primarily intended that the car be adapted for the transportation of passengers and accordingly a body 213 as illustrated in Figures 10 and 11 is supported on the chassis construction herein above described.

The body 213 comprises sides 214, ends 215 and a roof 216. The sides 214 and ends 215 are suitably secured adjacent the bottoms thereof to the members 161 of the base frame construction with the lower edges of the sides and ends extending substantially below their lines of attachment for substantially concealing the various control mechanisms supported by the frame construction thus presenting a neat external appearance as indicated in Figure 11. As also indicated in Figure 11 suitable housings 217 are secured to the base frame construction for covering the portions of wheels 53 extending above the floor line.

A suitable flooring 218 is laid on the sills 168 and transversely extending members 170 and 172 with housings 217 projecting thereabove and it is to be particularly noted that due to the arrangement and disposition of the various control elements the floor 218 is entirely unobstructed except for the four housings 217 above referred to thus providing a body of maximum carrying capacity.

The sides 214 are provided with suitable windows 219 and the ends 215 are provided with one or more windows 221 thus providing a body simulating more or less the modern trolley car body.

Suitable front and rear doors 222 and 223 are provided on the same side of the body and connected for pneumatic operation by the means above referred to. Suitable seats 224 are arranged within the body on opposite sides thereof and providing a longitudinal aisle 225 therebetween, some of the seats being built over the housings 217 thus utilizing the entire floor space within the body. An operator's seat 226 is positioned in advance of one row of seats 224 opposite door 222 and from which the various control devices above described are easily accessible. A passageway 227 is provided between aisle 225 and the rear door 223 opposite a seat 224 on the opposite side of the body and a seat 228 of a length equal to the width of the body extends across the rear end thereof. By this arrangement it will be seen that a maximum seating arrangement is provided as well as providing an unrestricted passage between the doors 222 and 223. A comfortable riding car as well as a car permitting expeditious admittance and discharge of passengers is thus provided.

Electric energy is conveyed to the motors 173 through a trolley or collector assembly 231 mounted on the roof 216 similar to the common practice in street trolley cars and as there is more or less vibration imparted to the body from the trolley as commonly supported, my invention comprises a mounting for the trolley of such construction as to avoid such vibrations. The mounting as indicated in detail in Figures 12 to 15 inclusive comprises a pair of end supports 232 the bases of which are of an arcuate formation simulating that of the transverse curvature of the roof 216. Each of the supports 232 is of L-formation in transverse section comprising a transversely flat roof engaging flange section 233 and secured to the outer face of each support 232 adjacent each end thereof is an L-shaped member 234 having a roof engaging flange 235 which together with flange 233 defines a relatively wide roof engaging foot.

Flanges 233 and 235 are provided with a felt lining for engagement with roof 216 and the opposite ends of supports 232 are secured to the roof. Resting on and secured to the flange 233 intermediate members 234 of each support 232 is a bar 236 provided with a straight upper surface upon which the opposite ends of a pair of transversely spaced bars 237 rest and to which they are secured by means of bolts 238. Disposed above bars 237 and spaced therefrom by rubber insulating washers 239 is a supporting plate 241 which is secured at the opposite edges thereof to bars 237 by bolts 242 which extend through bars 237, washers 239, rubber sleeves 243 disposed in apertures 244 in plate 241 and through rubber insulating washers 245 resting on plate 241, metallic washers 246 being interposed between the heads of bolts 242 and washers 245 and other metallic washers 247 interposed between securing nuts 248 on bolts 242 and the inner surfaces of bars 237.

A trolley pole 249 is pivotally connected at the inner end thereof at 251 to a support 252 on plate 241 and a helical tension spring 253 has one end thereof connected to pole 249 at 254 and the opposite end thereof connected to a block adjustable toward and from pole 249 by means of an adjusting screw 255 and slot guide 256. Pole 249 is yieldably maintained in operative position by means of spring 253 and a suitable hook or catch 257 is supported on the rear end of roof 216 for holding pole 249 in retracted or inoperative position.

A lightning arrestor 258 is provided and is secured in position by means of bolts 259. In accordance with the construction described a trolley mounting is provided in which a limited universal cushion movement is provided between plate 241 to which the trolley pole is secured and bars 237 through washers 239 and 245 and the sleeves 244 by means of which shocks or vibrations are absorbed without being transmitted to the car roof.

From the foregoing disclosure it will be apparent that a rail car is provided comprising a pair of front drive wheels and a pair of rear drive wheels, the front and rear wheel at each side of the car being driven by a separate electric motor and all of the wheels being individually pivotally mounted for automatic steering on curved sections of track, the pair of front wheels and the pair of rear wheels being interconnected by means providing for simultaneous movement of the wheels of each pair about their pivotal connections. At the same time the connecting means is yieldably urged to a central position relative to the frame and car body for normally maintaining the wheels parallel to the sides of the car body and for immediately drawing the wheels to such parallel position after rounding a curve and again starting on a straight section of track. The connecting means are provided with a cushion means for preventing flutter or "shimmying" of the wheels. The body is connected with the frame chassis construction, which has a yieldable connection with bars which in turn are yieldably supported from the wheel supporting side frames thus providing a highly cushioned car construction in which shocks and vibrations due to irregularities in the track as well as upon rounding curves are absorbed or minimized thus providing a comfortable riding car as well as eliminating otherwise excessive strain on the various parts entering into the construction which eventually would impair the operating efficiency of the car. At the same time the flexible cushioned drive connections between the motors 173 and housings 42 permit the yielding movement above referred to without detracting from the driving efficiency.

It will further be seen that the truck assemblies 10, motors 173 and the various control devices are arranged in substantial symmetrical relation relative to the base frame construction thus providing a car construction in which the weight is uniformly distributed. This arrangement further adds greatly to the efficiency thereof and permits the use of lighter structural elements. It will further be seen that the body of the car is of maximum carrying capacity and that the operator's seat therein is so disposed that the various control devices are readily accessible and that due to the nature of many of the control elements above described the safety of passengers being transported is substantially assured.

While the construction so far described is adapted for service on tracks it will be obvious that by the substitution of suitable control elements such as the steering arrangement and by the substitution of road engaging treads for the rail engaging treads 70 a car may be provided equally adapted for traveling on roads.

Figure 16:
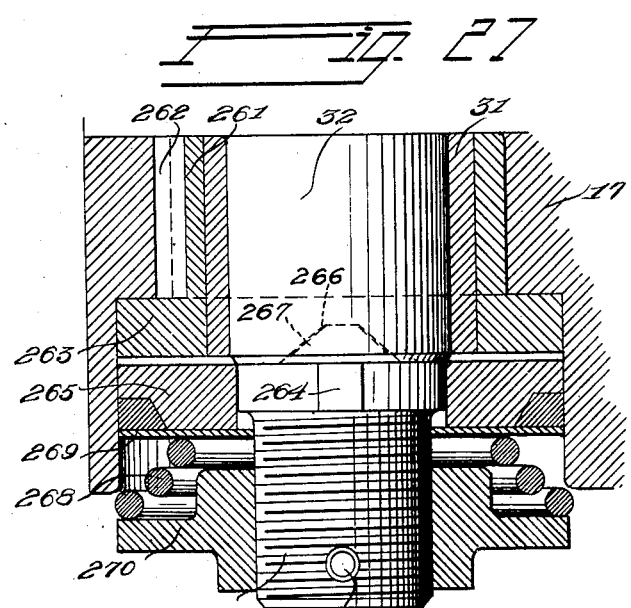
Figure 16 (Sheet 8) is a vertical sectional view on an enlarged scale of a modified form of lower trunnion bearing for use in my invention.

In Figure 16, Sheet 8, is illustrated a modification of the lower trunnion bearing in which a sleeve 261 is longitudinally keyed as indicated at 262 within bracket 17 and is provided with a lateral flange 263 whose inner surface is flush with the inner end of sleeve 31 and disposed downwardly of flange 263 and keyed for longitudinal movement on trunnion 32 as indicated at 264 is an alining washer 265. The opposed surfaces of flange 263 and washer 265 are provided with coacting cam recesses and cams 266 and 267 respectively which are normally in seated position. Washer 265 is yieldably urged toward flange 263 by means of a helical spring 268 interposed between a washer 269 engaging the inner surface of washer 265 and a flanged nut 270 adjustably engaging the inner threaded end 33 of trunnion 32 and maintained in adjusted position by means of a cotter 271.

In accordance with this arrangement trunnion 32 is capable of pivotal movement within sleeve 31 during steering movement of the wheel and as trunnion 32 revolves within sleeve 31 washer 265 which is keyed thereto will be rotated but as sleeve 261 is keyed against rotation flange 263 cannot rotate and consequently washer 265 will be forced downwardly longitudinally of trunnion 32 by cam 267 against the action of spring 268. It will therefore be seen that this arrangement provides a yieldable resistance to the turning movement of trunnion 32 which resistance is adjustably regulated by nut 270 and that the tendency of the cam and recess between flange 263 and washer 265 is to maintain trunnion 32 and consequently the wheel carried by the housing from which trunnion 32 projects in normal or parallel alined position. This arrangement causes the wheels to have a tendency to remain straight, in that they are yieldingly locked in straight position unless the yielding locking means just described is positively released by the engagement of the flanged wheels with a curve in the track.

In Figures 17 and 18, Sheet 4, is disclosed a modification of the construction illustrated in Figures 8 and 9 in which the rubber insulators are replaced by means embodying "Timken" swinging supports.

Referring to Figures 17 and 18 it will be seen that bars 136 are provided at the ends thereof with substantially depressed longitudinal extensions 272 defining supports for the constructions later described, the extensions being strengthened by reinforcing ribs 273 integral therewith as well as with bars 136. Extensions 272 are each provided with a central transversely elongated aperture 274 and further provided with a transversely extending arcuate recess 275 on each side of aperture 274. Seated upon extension 272 is a plate 276 provided with end flanges 277 engaging the opposite ends of extension 272 and plate 276 is secured to extension 272 by rivets 278. Plate 276 is provided with a central aperture 279 of the same configuration as, and alined with, aperture 274. Plate 276 is further provided with inwardly converging openings 281 of the same width as and in communication with recesses 275. Disposed above and in vertical spaced relation to each of the plates 276 is a plate 282 provided on the ends thereof with outwardly directed flanges 283. Plate 282 is provided with a central circular aperture 284 normally in vertical central relation with apertures 274 and 279 and plate 282 is further provided with outwardly converging openings 285 in vertical alinement with openings 281. Seated on the outer face of plate 282 between the flanges 283 is a rubber cushioning strip 286 which is secured to plate 282 by rivets 287. Resting upon and laterally embracing plate 282 and strip 286 is an elongated inwardly facing channel member 288 with the side flanges 289 thereof extending substantially inwardly of the inner surface of plate 282. Channel member 288 has one flange 289 thereof normally spaced from wall 139 of bar 136 and a rubber cushioning strip 291 is located between wall 139 and the adjacent flange 289 and is secured to wall 139 by rivets 292. The channel member 288 is provided on one end thereof with a downwardly directed flange 293 to which is secured by means of rivets 294 a rubber cushioning strip 295 positioned between flange 293 and the adjacent end of plate 282.

Disposed upon each pair of transverse oppositely disposed members 288 are the opposite end portions of a laterally opening channel member 296 corresponding to the member 145 in Figures 8 and 9 and each end of member 296 is provided with a downwardly directed flange 297 to which is secured by means of rivets 298 a rubber cushioning strip 299 disposed between flange 297 and the adjacent end of plate 282. Each member 296 at each end thereof is provided with an aperture 301 in vertical alinement with apertures 274, 279, 284 as well as apertures in strip 286 and member 288. Extending through each set of alined apertures is a vertically disposed bolt 302 with the head 303 thereof in engagement with a washer 304 normally in engagement with the inner face of extension 272 and bridging aperture 274, the washer being held in engagement with extension 272 by means of a helical spring 305 surrounding the outer end of bolt 302 with the inner end thereof in engagement with member 296 and the outer end thereof in engagement with a washer 306 adjustably positioned on bolt 302 by means of an adjusting nut 307. Secured to each member 296 adjacent each end thereof and in proximity to the respective member 288 is a limiting flange 308.

Interposed between plates 276 and 282 of each pair thereof is a pair of rocking members 309 one of which is disposed on each side of bolt 302 and each of the members 309 comprises a body portion 311 having the opposite upper and lower faces thereof convex toward plates 276 and 282 and in engagement therewith and each of the body members 311 is provided on each face thereof with a pair of teeth 312 of the general configuration in end view of gear teeth, the teeth resting in openings 281 and 285 and being capable of movement therein for permitting a rocking movement of body members 311 relative to plates 276 and 282 while maintaining the parts just referred to in definite relation to each other.

In accordance with the construction just described the body which is supported on members 296 is permitted a limited lateral rocking movement relative to the spring supported bars 136 through the rocking members 309 interposed between and cooperating with plates 276 and 282 which are maintained yieldably in engagement with members 309 by means of the helical spring 305 and relative movement is permitted between plates 276 and 282 by means of the elongated apertures 274 and 279 through which the head ends of bolts 302 extend, the movement of the various parts being cushioned by the rubber insulating strips 286, 295 and 299 and the rubber insulating strip 291 serves as a cushion upon movement of members 288 relative to the vertical end walls 139 of the spring supported bars 136. The trucks can thus move laterally to a limited degree relative to the body as they move over irregularities in the track without directly transmitting such lateral movement to the car body. The riding qualities of the car are thus greatly improved.

In Figures 35 and 36, Sheet 15 is disclosed a modification, and as at present a preferred modification of the cushioning means and involving insulating and oscillating means similar to the form of the invention disclosed in Figures 17 and 18.

Referring to Figs. 35 and 36 channel member 288 of the form disclosed in Figs. 17 and 18 is replaced by a channel member 288' provided with opposite end flanges 293' corresponding to flange 293 which directly engage the opposite ends of plate 282' the outer surface of which is directly engaged by the horizontal body portion of member 288' thus eliminating the cushion strips 286, 295 and 299. Secured to the horizontal body portion of member 288' and in contact therewith by rivets 287' is the corresponding body portion of an outwardly opening channel member 313 in which is seated the base portion of a rubber cushion 314 provided with an overhanging outer portion disposed within the channel of a relatively wide channel member 315 corresponding in function to member 296 in Figs. 17 and 18.

The base oscillating support is similar to that shown in Figs. 17 and 18 and the parts thereof are designated by similar reference characters primed, it will be noted however that rocking members 309' are not of as elongated form as the similar members 309 in Figs. 17 and 18. In this form of the invention spring 305 is replaced by a rubber disk member 305'.

Channel member 315 is connected to members 64 by brackets 316 and 316' secured to each other and to member 315 and the lateral and outer faces of members 64 as by riveting as indicated.

The operation of this form of construction is similar to that disclosed in Figs. 17 and 18 except that in this form by the provision of the substantially thick rubber cushions 314 greater cushioning is provided between the oscillator embodying members 309' and the channel member 315 thus eliminating objectional noise that may not be dampened out by the comparatively small amount of cushioning rubber employed in the form disclosed in Figs. 17 and 18.

In Figures 19 and 20, Sheet 9, is disclosed a modification of the invention wherein a rail car of the character above disclosed is provided in which the wheels thereof are driven by gasoline motors instead of by electric motors as in the first form of the invention.

Referring to Figures 19 and 20 in which is represented in top plan and side view the chassis of rail car embodying truck assemblies and a base frame structure of the character disclosed in the above embodiment of the invention. In said figures like parts are designated by the same reference characters and a further description thereof is deemed unnecessary.

In this form of the invention a gasoline motor 317 is disposed adjacent each side of the frame and substantially centrally of the length thereof and suitably secured thereto as indicated at 317'. Each of the motors may be of any approved type and is provided with a radiator 318, transmission 318', and an emergency brake 319 of the external contraction type, the transmissions being controlled by a rod 321 and lever 322 adjacent the operator's seat at the front end of the car and the clutches being controlled by a cross shaft 322' operable by a foot pedal extending through plate 324 at the front end of the car. The brakes 319 are operated by lever 320, through rod 323 and cross shaft 323'. A splined extensible and flexible drive shaft 325 projects rearwardly from each motor 317 and has a universal joint connection 326 with a shaft 327 extending into a gear housing 328 each of which housings is of the construction illustrated in detail in Figures 21 and 22, Sheet 10. Each of said housings comprises a casing 329 provided with an attaching foot portion 331 for attachment to the channel member 164 as represented in dotted lines of the base frame construction. Casing 329 is further provided with securing plates 333 and has secured in one wall thereof by bolts 334 a bearing cup 335 in which is disposed a roller bearing assembly 336 in which the inner end of shaft 327 is rotatably journaled. The opposite wall of casing 329 has secured therein in transverse alinement with cup 335 a combined bearing and stuffing box member 337 in which is positioned a roller bearing assembly 338 in which an intermediate portion of shaft 327 is rotatably journaled and a cap 339 is detachably secured to member 337 for confining a lubricant packing 341 in contact with shaft 327. Secured in each of the opposite walls of casing 329 below shaft 327 by means of bolts 342 is a centrally apertured plate 343 in which is positioned a combined bearing and packing containing member 344. Positioned within each member 344 is a roller bearing assembly 345 in the opposite transversely alined ones of which reduced portions 346 of a shaft 347 are rotatably journaled and a lubricant packing 348 is confined within each member 344 in contact with the adjacent end of shaft 345 by a plate 349 secured to member 344 by bolts 351.

Secured to each of the shafts 327 and 347 between the respective roller bearing assemblies by means of a key 352 is a sprocket 353 adapted to be operatively connected by a sprocket chain (not shown) for transferring rotation of shaft 327 induced by the respective motor to shaft 347.

It will be noted that the openings in the opposite walls of casing 329 for the reception of plates 343 are of a diameter exceeding that of sprockets 353 whereby the sprockets can be introduced within the casing, the respective shafts slid thereinto after which the bearing assemblies are mounted in position. Casing 329 is provided in the opposite walls thereof with suitable lubricant filling openings 354 by means of which a suitable lubricant can be introduced into casing 329 for effectively lubricating the rotating shafts and bearings.

Housings 328 are secured through foot portions 331 to the longitudinally extending channel members 164 of the base frame construction in outwardly diverging relation such that shafts 347 will be disposed inwardly and downwardly of the motor driven shafts 327 as indicated in Figure 19 in order that the front wheel propeller shafts about to be described will extend past the inner sides of motors 317.

While the driving connection between shafts 327 and 347 is disclosed as a sprocket construction it will be obvious that by a suitable disposition of the shafts meshing gears may be keyed thereto for directly transferring the rotation of shaft 327 to shaft 347.

Connected with the rear ends of shafts 347 by universal joints 355 are the adjacent end of splined propeller shafts 356 whose opposite ends are connected to shafts 48 by universal joints 357. Connected to the front ends of shafts 347 by universal joints 358 are splined propeller shafts 359 which extend inwardly of and parallel with motors 317 and are connected through universal joints 361 to the adjacent ends of splined shafts 362 whose opposite ends are connected by universal joints 363 to the worm shafts 48 of the front wheels.

In this form of the invention it will be understood that many of the control elements disclosed in the first form of the invention are not required and the various elements necessary in the operation of gasoline motors such as batteries 364, exhausts 365 and mufflers 366 are provided.

In accordance with this form of the invention the front and rear wheels at each side of the car are individually driven by a gasoline motor substantially in the same manner in which the wheels are driven by the electric motors 173 in the first form of the invention and it will be understood that the car in accordance with this form of the invention is equally adapted for road service as set forth in connection with the form of the invention previously described.

In Figures 23 and 24, Sheet 11, is disclosed a further modification of the invention comprising a gas-electric drive arrangement and in which an electric generator 371 is in operative connection with each of the internal combustion motors 317. Disposed adjacent each end of the frame and secured thereto in transversely spaced relation is a pair of electric motors 372 which are in electrical connection with the generators 371. Each of the motors is provided with a brake construction 373 and those of each pair of motors are connected by an operating shaft 374 in the manner set forth in connection with motors 173 in the first form of the invention. Operatively connected with each of the motors 372 by a universal joint is one end of a relatively short telescopic drive shaft 375 the opposite ends of which are connected by universal joints 376 to the worm shafts 48 of the respective wheels 53.

In accordance with this form of the invention an electrically operated rail car is provided which is self generative and thus capable of traveling upon tracks not provided with electric trolleys. Furthermore in this form of the invention motors 372 are disposed in relatively close position to wheels 53 thus necessitating comparatively short propeller shafts. It will be observed also that the weight of the motors is balanced with respect to a line extending transversely of the frame centrally thereof.

It will be understood that the car in accordance with this form of the invention can also be readily adapted for road service upon substituting suitable road engaging wheel treads for the rail engaging treads 70 and providing suitable steering arrangements known in the art.

In Figures 25 and 26, Sheet 12, is illustrated a still further modification of the invention wherein each of the truck assemblies 10 comprises a pair of transversely extending longitudinally spaced shafts or rods 381 corresponding to shafts or rods 11 in the first form of the invention, but in this form of the invention the inner or adjacent shafts are in a plane somewhat higher than that of the outer shafts and the spring assemblies 382 corresponding to springs 131 have the outer ends pivotally connected to the opposite ends of the outer shafts 381 and the inner or adjacent ends are disposed below and connected to the opposite ends of adjacent shafts 381 by shackles 383 thus disposing the pairs of springs at opposite ends of the car in slightly outwardly inclined position toward the transverse center of the car. Secured to the intermediate portions of springs 382 by means of U-bolts 384 are bars 385 similar to bars 136 in the first form of the invention.

In this form of the invention frame members 386 corresponding in function to side frames 12 are substantially straight in plan and provided with eyes 387 in the opposite ends thereof for slidable reception of shafts or rods 381 thus permitting movement of frame members 386 longitudinally of the shafts for adjusting the distance between the wheel treads 70, suitable means such as bolts being employed to hold the frame members against inadvertent movement along the shafts. Frame members 386 are provided centrally thereof with brackets 388 for pivotally receiving trunnions similar to trunnions 24 and 32 formed on housings 389 in which are disposed the cooperating worm gears and worms, as in the first form of the invention, but it will be noted that in this form of the invention the trunnions are not located within the inner planes of the wheel treads as in the first form of the invention but are located inwardly of such planes toward the longitudinal center line of the car somewhat in the manner as disclosed in my copending application Serial No. 281,477 filed May 29, 1928.

Each transversely opposite pair of housings 389 are connected by a steering rod 391 for effecting simultaneous movement of the wheels of each pair as in the first form of the invention.

In this form of the invention each of the wheels 53 is independently driven by an electric motor 392 as in the form disclosed in Figures 23 and 24 which motors are adapted to receive electric energy through a trolley or a gas-electric combination as disclosed in Figures 23 and 24 which motors are adapted eratively connected with a wheel 53 by means of a drive shaft 393 which at one end thereof is connected to worm shaft 48 by a universal joint 394 and which at the opposite end is connected to the drive shaft of motor 392 by a universal joint 395.

In accordance with this form of the invention all four wheels are separately and independently driven and the wheels are capable of transverse adjustment for adapting the car to various gauge tracks and the construction is such as to provide a car of extremely light and durable construction.

Figure 27:
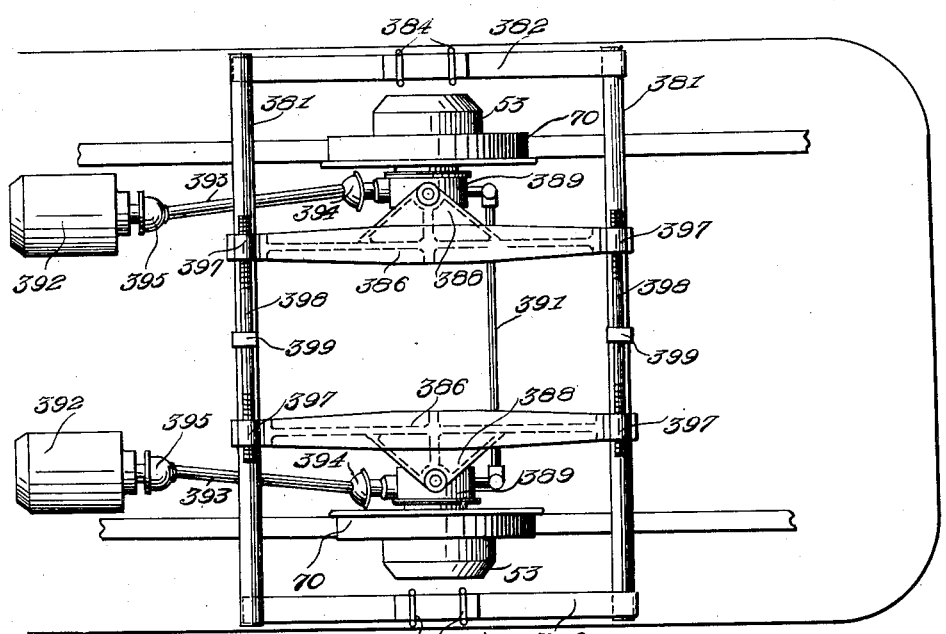
Figure 27 (Sheet 8) is a fragmental top plan view of the construction illustrated in Figure 25, showing an adjustable means for varying the transverse distance between the rail engaging wheels adapting them to various gage tracks.

A modification of the invention just described is disclosed in Figure 27, Sheet 8, wherein members 386 are provided with internally threaded ears 397 above the apertured end portions thereof for the reception of the oppositely threaded ends of adjusting rods 398 provided with suitable tool engaging portions 399 whereby upon rotation of rods 398 frame members 386 can be readily adjusted longitudinally of shafts 381 for varying the transverse distance between opposite wheel treads 70 thus adapting the car in an expeditious manner to different gauge tracks.

In Figures 28, 29 and 30, Sheets 13 and 3, is disclosed a further modification of the invention in which a single electric motor 401 is secured to the base frame construction substantially in the longitudinal center thereof and has a driving connection with a differential in a housing 402 through a drive shaft 403 one end of which is connected to the motor shaft by a universal joint 404 and the opposite end of which is connected to the differential by a universal joint 405. Housing 402 at the opposite ends thereof is provided with vertically alined extensions or brackets 406 for receiving the trunnions 407 carried by housings 408 of one pair of laterally alined wheels 409 corresponding to wheels 53 in the first form of the invention. Wheels 409 are driven in usual manner by axles in housing 402 operatively connected with the differential therein but such axles are provided with universal joints coincident with the pivoting trunnions 407 in order to maintain a driving connection between the differential and wheels 409 upon movement thereof about their pivotal connections when traveling on a curved section of track, the opposite wheels being maintained in parallelism by a connecting rod 411 whose opposite ends are pivotally connected at 412 to arms 413 projecting outwardly from housings 408.

The opposite or front end of the car body is supported by an axle 414 the central portion of which is centrally depressed at 415 as indicated in Figure 30 and the opposite ends thereof are provided with vertically alined ears 416 for the reception of pins 417 forming pivotal connections for the inner ends of stub axles 418 to the outer ends of which wheels 419 are rotatably mounted. Axles 418 adjacent the pivotal connections thereof are provided with arms 421 to the free ends of which are pivotally connected at 422 the opposite ends of a steering connecting rod 423 for maintaining wheels 419 in parallelism at all times.

In accordance with this form of the invention a rail car construction is provided in which one pair of wheels is differentially driven by a single motor adapted to receive electric energy as by means of a trolley and all four wheels of which are pivotally mounted for automatic steering upon encountering curved sections of track which is accomplished without the utilization of the usual heavy truck construction thus providing a rail car which is extremely light and embodying relatively few simple parts. The axles may be directly connected to the frame by springs as in automotive practice.

In Figures 31 and 32, Sheet 14, a still further modification of the invention is disclosed embodying substantially the arrangement disclosed in Figures 28 and 29 but in which rods 411 and 423 are displaced by axles 424 which are pivotally connected adjacent their ends at 425 to the outer ends of arms 426 projecting outwardly from housings 408 and stub shafts 418. On the opposite ends of axles 415 are rotatably mounted pony wheels 427 which engage the track immediately adjacent wheels 409 and 419 and serve to steer the wheels 409 and 419.

In accordance with this form of the invention a single motor center drive rail car construction is provided in which only one pair of wheels are driven and in which all four wheels are individually pivotally mounted for automatic steering and in which each pair of wheels are maintained in parallelism in their pivotal or steering movements by an axle supporting a pair of wheels in engagement with the track upon which the car is traveling.

In Figure 33, Sheet 2, is illustrated more or less diagrammatically a train of cars traveling upon a curved section of track in which the adjacent ends of opposite cars are pivotally coupled at 431 for permitting relative turning movement thereof, suitable flexible enclosing members 432 being secured to the adjacent ends of the cars for enclosing the spaces therebetween while permitting the relative turning movements thereof.

In accordance with this form of the invention a single axle 433 is disposed adjacent the meeting ends of each pair of cars and the axle is preferably located in alignment with the pivotal connections of the cars with the exception of one car which provides the motive power for the train of cars. As illustrated the motive power car is provided with a pair of axles 434 supporting, at the opposite ends thereof, wheels 435 in the manner disclosed in the copending application above referred to and each wheel 435 is driven by a separate electric motor 436 through a flexible drive shaft 437 as disclosed in said copending application and also in Figure 25 of the present application. While as above described the motive supplying car is provided with a pair of axles 434 one of the axles is disposed relatively close to the pivotal connection thereof with the adjacent car. The rear car of the train is of course provided with a wheel supporting axle 438 inwardly of the rear end thereof.

It will accordingly be seen that by this arrangement a train of cars is provided well adapted for track service and comprising a minimum number of parts of substantial simplicity thus considerably reducing the expense as well as providing a train of cars of considerably reduced weight and while I have disclosed a specific form of axle construction it is obvious that other forms as disclosed in the various modifications above enumerated may well be employed.

While I have disclosed certain specific embodiments of my invention, the invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency are intended to be embraced therein.

Accordingly, what I claim and desire to secure by Letters Patent is:

1. A rail car comprising a pair of truck assemblies; each of said truck assemblies comprising only one pair of dirigibly mounted wheels; a base frame construction supported on said truck assemblies; a body supported on said base frame construction; power mechanism supported by said base frame construction; and flexible drive connections between said power mechanism and certain of said wheels.

2. The construction defined in claim 1 in which each of said truck assemblies comprises a pair of spaced parallel shafts; springs flexibly connected adjacent the opposite ends of said shafts; a pair of side frames laterally adjustably connected to said shafts; said side frames providing pivotal connections for said wheels.

3. The construction defined in claim 1 in which resilient cushioning means are interposed between said truck assemblies and said base frame construction.

4. A rail car comprising a body; a pair of side frames disposed adjacent each end of said body and yieldably connected thereto; a gear housing pivotally connected with each of said side frames for steering movement; a wheel detachably connected with each of said housings; power mechanism supported beneath said body; and flexible drive connections between said power mechanism and certain of said wheels.

5. The construction defined in claim 4 together with means for yieldably maintaining said pivotally mounted wheels in a position parallel with the sides of said body and for returning said wheels to such parallel position after having been deflected by a curved section of the track and further separate means to prevent flutter of said wheels.

6. The construction defined in claim 4 in which said pivotal connections comprise means for yieldably resisting the pivotal movement of said housings and for yieldably locking said wheels in a position parallel to the sides of said body.

7. A rail car comprising a base frame construction; a body supported on said base frame construction; a truck assembly disposed beneath each end of said base frame construction for supporting same; each of said truck assemblies comprising a pair of longitudinally spaced and transversely disposed shafts, springs flexibly connected adjacent opposite ends of said shafts and each supporting a bar to which said base frame construction is connected, a pair of side frames having the opposite ends thereof adjustably connected to said shafts, a wheel construction having a vertically disposed pivotal connection with each of said side frames, power mechanism supported by said base frame construction; and a flexible drive connection between each of said wheel constructions and said power mechanism.

8. The construction defined in claim 7 together with means secured to one of said shafts of each of said truck assemblies for cushioning the pivotal movement of said wheel constructions and for avoiding wobbling thereof.

9. The construction defined in claim 7 together with means for adjusting the distance between the side frames of each truck assembly for altering the spacing between the wheels for different gauge tracks.

10. A rail car comprising a truck assembly including a pair of side frames; a gear housing pivotally connected with each of said side frames; a wheel detachably connected with each of said housings with the tread thereof substantially in the vertical plane of said pivotal connections; said wheel comprising an internal brake drum disposed outwardly of said housing; brake shoes having adjacent ends thereof pivotally connected with said housing; rollers carried by the free ends of said brake shoes; a shaft journalled in said housing and provided on one end thereof with a cam in engagement with said rollers; yieldable means connected with said brake shoes for yieldably maintaining said rollers in engagement with said cam; a shaft actuating casting journalled on said shaft; and cooperating means carried by said shaft and said casting for imparting movement of said casting to said shaft and for effecting adjustment of said shaft relative to said casting.

11. A rail car comprising a body; a pair of bars yieldably and rockably connected with said body adjacent each end thereof; a pair of shafts yieldably connected with each of said pairs of bars; a pair of side frames adjustably connected with said pair of shafts; wheels vertically pivotally connected with each of said side frames; power mechanism disposed beneath said body; and flexible drive connections between said power mechanism and said wheels.

12. A rail car comprising a pair of truck assemblies; each of said truck assemblies comprising a pair of spaced parallel shafts; a pair of side frames supported by said shafts; rail engaging drive wheels pivotally connected with each of said side frames; a pair of bars yieldably connected to the opposite ends of said shafts; a frame construction yieldably supported on said bars; a body supported on said frame construction; power means supported by said frame construction; and flexible drive connections between said power means and said drive wheels.

13. A four-wheel rail car comprising two truck assemblies, a frame, means to resiliently connect said truck assemblies to said frame, further connections between said frame and assemblies including cushioning elements arranged to permit limited lateral movement between said frame and truck assemblies, a pair of flanged wheels in each truck assembly, each of said wheels being mounted for dirigible movement about a substantially vertical axis approximately passing through the point of contact between the wheel flange and the rail.

14. A four-wheel rail car comprising two truck assemblies, a frame, means to resiliently connect said truck assemblies to said frame, further connections between said frame and assemblies including cushioning elements arranged to permit limited lateral movement between said frame and truck assemblies, a pair of flanged wheels in each truck assembly, means whereby each of said wheels may be steered about an axis passing approximately through the point of contact between the wheel flange and the rail and means to cushion the rim of said wheels with respect to said steering means.

15. A four-wheel rail car comprising two truck assemblies, a frame, means to resiliently connect said truck assemblies to said frame, further connections between said frame and assemblies including cushioning elements arranged to permit limited lateral movement between said frame and truck assemblies, a pair of flanged wheels dirigibly mounted in each of said truck assemblies for steering movement about substantially vertical axes located approximately in alignment with the inner surface of the wheel flanges, and mechanism to automatically cause said dirigibly mounted wheels to tend to return to a straight position and to prevent wobbling of said wheels.

16. A four-wheel rail car comprising two truck assemblies, a frame, means to resiliently connect said truck assemblies to said frame, a pair of flanged wheels dirigibly mounted in each of said truck assemblies for steering movement about substantially vertical axes located approximately in alignment with the inner surface of the wheel flanges, driving means for each of said wheels disposed at one side of the axis on which it is steered and brake mechanism for each wheel disposed on the other side of the axis of that wheel.

17. A four-wheel rail car comprising a side frame for each wheel, a wheel dirigibly mounted in each of said side frames and for rotation about an axis disposed approximately midway between the upper and lower limits of said side frame, means to secure said side frames together in pairs so that the frames may be adjusted laterally and means to support a car body on said last named means with its main floor line substantially below the tops of said side frames.

18. The combination defined in claim 17 in which, each of said wheels is mounted in said side frame for steering movement about a substantially vertical axis that is approximately in alinement with the inner surface of the rails upon which said wheels operate and in which means are provided interconnecting the pairs of side frames and wheels carried thereby so that said wheels have a tendency to assume a position extending endwise of said frames.

19. A four-wheel rail car comprising a frame, motors supported by said frame approximately midway between the ends thereof and in substantially balanced relation with respect to a line extending centrally longitudinally of said frame, a pair of side frames arranged approximately in endwise alinement with said motors, said side frames adjacent each end of said frame being secured together, a wheel dirigibly mounted in each of said side frames, drive shafts extending from said motors to certain of said wheels and means to cause said wheels to automatically remain in a position extending endwise of said frame unless moved therefrom by engagement with a curved rail.

20. The combination defined in claim 19 in which said motors are secured to said frame in position that the drive shafts thereof extend substantially horizontally to said dirigible wheels and in which said dirigible wheels are mounted in said side frames so that their axes of rotation are disposed substantially midway between the upper and lower limits of said side frames, whereby a construction having a low floor line is provided.

21. A four-wheel rail car comprising a frame, two pairs of wheels dirigibly mounted in said frame, each of said wheels comprising inner and outer rim members, a cushion member disposed between said rim members, a tread member locating ring member secured to the outer surface of said outer rim member; and a tread member secured to the outer surface of said outer rim member in engagement with said ring member.

22. A rail car comprising a car body, a pair of rail wheels supporting the forward end of said body, a pair of rail wheels supporting the rear end of said body, means connecting each pair of wheels together so that each wheel is free to swing about a substantially vertical axis as the vehicle rounds a curve, means to resiliently connect the wheels to said body, elements to permit limited cushioned lateral movement between said wheels and body, power means supported by said body, and flexible drive shafts operatively connecting each of said wheels and said power means.

23. A rail car comprising a car body, a pair of rail wheels supporting the forward end of said body, a pair of rail wheels supporting the rear end of said body, means connecting each pair of wheels together so that each wheel is free to swing about a substantially vertical axis passing approximately through the point of contact between the wheel flange and the rail, means to resiliently connect the wheels to said body, elements to permit limited cushioned lateral movement between said wheels and body, power means supported by said body, and flexible drive shafts operatively connecting each of said wheels and said power means.

24. A rail car comprising a body, a pair of wheels supporting each end of said body, means to connect each pair of wheels together so that each wheel is dirigible about a substantially vertical axis, means to yieldingly support said body on said first named means including cushioning connections, and cushioning connections between the rims of said wheels and said first named means.

25. A rail car comprising a body, a pair of wheels supporting each end of said body, means to connect each pair of wheels together so that each wheel is dirigible about a substantially vertical axis, means to yieldingly support said body on said first named means including cushioning connections, electric motors supported by said body and operatively connected to said wheels, a collector assembly including a trolley supported by said body, and cushioning connections between said assembly and said body.

26. A rail car comprising a body, a pair of flanged wheels to support each end of said body, means to connect each pair of wheels together so that each wheel can swing about an axis approximately in the plane of the inner surface of the wheel flange and means to yieldingly support said body on said first named means, said means including cushioned connections permitting limited lateral relative movement between said body and said first named means.

27. A rail car comprising a body, a pair of flanged wheels to support each end of said body, means to connect each pair of wheels together so that each wheel can swing about an axis approximately in the plane of the inner surface of the wheel flange, connecting means permitting limited cushioned movement in a plurality of directions between said body and said first named means and means to yieldingly cause each wheel to maintain a position in which said plane is parallel to the length of said body and to prevent substantial flutter thereof.

28. A rail car truck comprising side frames, means to interconnect said side frames so that the spacing thereof may be varied by adjustment of said frames along said means, wheels supported in said side frames, and resilient elements secured to said means so that a car body may be secured thereto.

29. A rail car truck comprising side frames, means to interconnect said side frames so that the spacing thereof may be varied by adjustment of said frames along said means, a dirigible wheel supported in each side frame, springs carried by said means so that a car body may be secured thereto and means attached to said springs and including cushioning connections for the car body.

In testimony whereof I affix my signature.

WILLIAM B. FAGEOL.